United States Patent
Nakamura

(10) Patent No.: US 9,519,373 B2
(45) Date of Patent: Dec. 13, 2016

(54) MULTI-SCREEN DISPLAY APPARATUS PROVIDED WITH TOUCH PANEL, AND DISPLAY METHOD EMPLOYED IN MULTI-SCREEN DISPLAY APPARATUS PROVIDED WITH TOUCH PANEL

(71) Applicant: Sharp Kabushiki Kaisha, Osaka-shi, Osaka (JP)

(72) Inventor: Tatsunori Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 31 days.

(21) Appl. No.: 14/430,272

(22) PCT Filed: Oct. 7, 2013

(86) PCT No.: PCT/JP2013/077234
§ 371 (c)(1),
(2) Date: Mar. 23, 2015

(87) PCT Pub. No.: WO2014/054818
PCT Pub. Date: Apr. 10, 2014

(65) Prior Publication Data
US 2015/0253920 A1    Sep. 10, 2015

(30) Foreign Application Priority Data

Oct. 5, 2012  (JP) .................................. 2012-223378

(51) Int. Cl.
*G06F 3/041* (2006.01)
*G09G 5/14* (2006.01)
(Continued)

(52) U.S. Cl.
CPC .......... *G06F 3/0416* (2013.01); *G06F 3/0488* (2013.01); *G09G 5/003* (2013.01); *G09G 5/14* (2013.01);
(Continued)

(58) Field of Classification Search
CPC ...... G06F 3/0416; G06F 3/0488; G09G 5/003; G09G 5/14; G09G 2320/08; G09G 2340/0407; G09G 2370/20; G09G 2370/24
(Continued)

(56) References Cited

U.S. PATENT DOCUMENTS

| 2003/0223016 A1 | 12/2003 | Izawa |
| 2005/0128530 A1 | 6/2005 | Aiba et al. |
| 2006/0197751 A1 * | 9/2006 | Iijima .................. G06F 3/0481 345/173 |

FOREIGN PATENT DOCUMENTS

| JP | 2001-142645 A | 5/2001 |
| JP | 2003-304481 A | 10/2003 |

(Continued)

OTHER PUBLICATIONS

Official Communication issued in International Patent Application No. PCT/JP2013/077234, mailed on Dec. 3, 2013.

*Primary Examiner* — Stephen Sherman
(74) *Attorney, Agent, or Firm* — Keating & Bennett, LLP

(57) ABSTRACT

A coordinate processing unit (23) defines, from a coordinate value of a touched position acquired by a sensor unit (21) and a display mode, a video corresponding to the touched position, and converts the coordinate value into a coordinate value in the defined video, and the coordinate value converted by the coordinate processing unit (23) is transmitted to PC(0) to (2) serving as a supply source of the defined video.

6 Claims, 19 Drawing Sheets

(51) Int. Cl.
*G06F 3/0488* (2013.01)
*G09G 5/00* (2006.01)

(52) U.S. Cl.
CPC .. *G09G 2320/08* (2013.01); *G09G 2340/0407* (2013.01); *G09G 2370/20* (2013.01); *G09G 2370/24* (2013.01)

(58) Field of Classification Search
USPC ..... 345/173–178, 1.1–3.4; 178/18.01–18.09, 178/18.11
See application file for complete search history.

(56) References Cited

FOREIGN PATENT DOCUMENTS

| | | |
|---|---|---|
| JP | 2005-181404 A | 7/2005 |
| JP | 2006-059083 A | 3/2006 |
| JP | 2007-079240 A | 3/2007 |

\* cited by examiner

VIDEO PROCESSING PARAMETER
- x START COORDINATE $posx_i$
- y START COORDINATE $posy_i$
- x RESOLUTION $dispx_i$
- y RESOLUTION $dispy_i$
- x COORDINATE ENLARGEMENT RATE $rx_i$
- y COORDINATE ENLARGEMENT RATE $ry_i$
- ROTATIONAL ANGLE $\alpha_i$
- PRIORITY ORDER $pri\_i$
(i = 0, 1, 2)

DISPLAY EXAMPLE WHEN pri_0 = 1, pri_1 = 2 and pri_2 = 0

FIG. 21

| ACQUISITION TIME | 0 | 1 | 2 | 3 | 4 | 5 | 6 |
|---|---|---|---|---|---|---|---|
| ACQUIRED COORDINATE | * | * | * | (1480, 360) | (1480, 360) | (1480, 360) | (1482, 362) |
| ACQUISITION STATE | * | * | * | TOUCH DOWN | * | * | TOUCH MOVE |

| ACQUISITION TIME | 7 | 8 | 9 | 10 | 11 | 12 | 13 |
|---|---|---|---|---|---|---|---|
| ACQUIRED COORDINATE | (1484, 364) | (1486, 366) | (1488, 368) | (1488, 368) | (1488, 368) | * | * |
| ACQUISITION STATE | TOUCH MOVE | TOUCH MOVE | TOUCH MOVE | * | * | TOUCH UP | * |

| ACQUISITION TIME | 14 | 15 | 16 | 17 | 18 | 19 | 20 |
|---|---|---|---|---|---|---|---|
| ACQUIRED COORDINATE | * | (1488, 368) | * | (1488, 368) | (1488, 368) | (1488, 368) | * |
| ACQUISITION STATE | * | TOUCH DOWN | TOUCH UP | DBLCLK TOUCH | * | * | TOUCH UP |

FIG. 22

| DISPLAY MODE | INPUT RESOLUTION | VIDEO PROCESSING PARAMETER | DISPLAY VIDEO AND ACQUIRED COORDINATE | CONVERTED COORDINATE |
|---|---|---|---|---|
| AUTOMATIC ZOOMING MODE | 3840x2160 | rx = 1, ry = 1<br>posx = 0, posy = 0<br>α = 0° | (2560, 720) | (2560, 720) |
| AUTOMATIC ZOOMING MODE | 1920x1080 | rx = 2, ry = 2<br>posx = 0, posy = 0<br>α = 0° | (2560, 720) | (1480, 360) |
| Dot by Dot | 1920x1080 | rx = 1, ry = 1<br>posx = 480, posy = 270<br>α = 0° | (1960, 630) | (1480, 360) |
| PORTRAIT DISPLAY | 1920x1080 | rx = 1.125, ry = 1.125<br>posx = 350, posy = 0<br>α = 90° | (1204, 1665) | (1480, 360) |

MULTI-SCREEN DISPLAY APPARATUS PROVIDED WITH TOUCH PANEL, AND DISPLAY METHOD EMPLOYED IN MULTI-SCREEN DISPLAY APPARATUS PROVIDED WITH TOUCH PANEL

TECHNICAL FIELD

The present invention relates to a display apparatus, and in particular relates to a multi-screen display apparatus provided with a touch panel in which a touch panel is mounted as one of user interfaces and capable of multi-screen display, and a display method thereof.

BACKGROUND ART

In recent years, a display apparatus provided with a touch panel in which a touch panel is mounted as one of user interfaces, such as a smartphone and a tablet terminal, has been known.

In a general display apparatus provided with a touch panel, a display apparatus and a touch panel which outputs a position coordinate of a touched part are integrated. An example of such a display apparatus provided with a touch panel includes an image display apparatus provided with a touch panel disclosed in PTL 1.

In the image display apparatus provided with a touch panel, a coordinate acquired from a sensor unit of a touch panel is converted at a touch panel control unit in accordance with a parameter used in a video processing unit and the converted coordinate is transmitted to a PC (personal computer) serving as a supply source of a video, which is connected to the display apparatus, whereby a touched position on the touch panel is associated with the video which is displayed on the display apparatus.

CITATION LIST

Patent Literature

PTL 1: Japanese Unexamined Patent Application Publication No. 2001-142645 (Publication date: May 25, 2001)

SUMMARY OF INVENTION

Technical Problem

In the meantime, a display apparatus capable of displaying videos from a plurality of PCs at arbitrary positions of a display unit simultaneously (hereinafter, referred to as multi-screen display apparatus) has been proposed, and it is considered to realize a multi-screen display apparatus provided with a touch panel by mounting a touch panel in this multi-screen display apparatus, but there is a problem as follows.

In the multi-screen display apparatus, a position and a size of a screen are able to be changed. For example, there is a multi-screen display apparatus mounted with several types of display modes (one-screen display, two-screen display and four-screen display) and a window system used for a PC. Each time a position or a size of the screen is changed, a coordinate of a touched position on the touch panel and a coordinate in a video which is displayed are displaced. Therefore, when the video is input from the PC, positioning (calibration) needs to be performed. That is, it is necessary to convert the coordinate of the touched position on the touch panel into a coordinate corresponding to the video from the PC to thereby associate the two coordinates with each other.

Accordingly, when the touch panel is mounted in the multi-screen display apparatus, each time a position or a size of the screen is changed, the calibration needs to be performed, thus posing a problem that operability is impaired.

The present invention has been made in view of the aforementioned problem and an object thereof is to provide a multi-screen display apparatus provided with a touch panel having excellent operability in which displacement between a coordinate of a touched position on a touch panel and a coordinate of a video which is displayed is not caused even when a position or a size of a screen is changed, and a display method thereof.

Solution to Problem

In order to solve the aforementioned problem, a multi-screen display apparatus provided with a touch panel according to one aspect of the present invention comprises: a display unit that displays videos supplied from a plurality of video supply devices on respectively different screens simultaneously; a multi-screen processing unit that processes the videos supplied from the video supply devices according to a display mode that defines the number of screens for simultaneous display on a display screen of the display unit and defines predetermined processing for the videos, and supplies to the display unit; a touch panel that is arranged so as to cover the display screen of the display unit; a coordinate acquisition unit that acquires, from a touched position on the touch panel, a coordinate value of the touched position; a coordinate processing unit that defines a video corresponding to the touched position from the coordinate value acquired by the coordinate acquisition unit and the display mode and converts the coordinate value into a coordinate value in the defined video; and a coordinate transmission unit that transmits the coordinate value converted by the coordinate processing unit to the video supply device serving as a supply source of the defined video.

In order to solve the aforementioned problem, a display method according to one aspect of the present invention is a display method of a multi-screen display apparatus provided with a touch panel including a display unit that displays videos supplied from a plurality of video supply devices on respectively different screens simultaneously; a multi-screen processing unit that processes the videos supplied from the video supply devices according to a display mode that defines the number of screens for simultaneous display on a display screen of the display unit and defines predetermined processing for the videos, and supplies to the display unit; and a touch panel that is arranged so as to cover the display screen of the display unit, comprising: a coordinate acquisition step of acquiring, from a touched position on the touch panel, a coordinate value of the touched position; a coordinate processing step of defining a video corresponding to the touched position from the coordinate value acquired by the coordinate acquisition step and the display mode and converting the coordinate value into a coordinate value in the defined video; and a coordinate transmission step of transmitting the coordinate value converted by the coordinate processing step to the video supply device serving as a supply source of the defined video.

In order to solve the aforementioned problem, a multi-screen display apparatus provided with a touch panel according to one aspect of the present invention comprises: a display unit that displays videos supplied from a plurality of video supply devices on respectively different screens simultaneously; a multi-screen processing unit that processes the videos supplied from the video supply devices according to a display mode that defines the number of screens for simultaneous display on a display screen of the display unit and defines predetermined processing for the videos, and supplies to the display unit; a video processing parameter control unit that sets a video processing parameter for executing the display mode used for video processing in the multi-screen processing unit; a touch panel that is arranged so as to cover the display screen of the display unit; a coordinate acquisition unit that acquires, from a touched position on the touch panel, a coordinate value of the touched position; and a video defining unit that defines a video corresponding to the touched position from the coordinate value acquired by the coordinate acquisition unit and the display mode, wherein the video processing parameter control unit changes the video processing parameter of the video defined by the video defining unit according to the coordinate value acquired by the coordinate acquisition unit.

In order to solve the aforementioned problem, a display method according to one aspect of the present invention is a display method of a multi-screen display apparatus provided with a touch panel including a display unit that displays videos supplied from a plurality of video supply devices on respectively different screens simultaneously; a multi-screen processing unit that processes the videos supplied from the video supply devices according to a display mode that defines the number of screens for simultaneous display on a display screen of the display unit and defines predetermined processing for the videos, and supplies to the display unit; and a touch panel that is arranged so as to cover the display screen of the display unit, comprising: a coordinate acquisition step of acquiring, from a touched position on the touch panel, a coordinate value of the touched position; a video defining step of defining a video corresponding to the touched position from the coordinate value acquired by the coordinate acquisition step and the display mode; a video processing parameter change step of changing a video processing parameter of the video defined by the video defining step according to the coordinate value acquired by the coordinate acquisition step; and a video processing step of performing processing of the video defined by the video defining step by using the video processing parameter changed by the video processing parameter change step.

In order to solve the aforementioned problem, a multi-screen display apparatus provided with a touch panel according to one aspect of the present invention comprises: a display unit that displays videos supplied from a plurality of video supply devices on respectively different screens simultaneously; a multi-screen processing unit that processes the videos supplied from the video supply devices according to a display mode that defines the number of screens for simultaneous display on a display screen of the display unit and defines predetermined processing for the videos, and supplies to the display unit; a video processing parameter control unit that sets a video processing parameter for executing the display mode used for video processing in the multi-screen processing unit; a touch panel that is arranged so as to cover the display screen of the display unit; a coordinate acquisition unit that acquires, from a touched position on the touch panel, a coordinate value of the touched position; a coordinate transmission unit that transmits the coordinate value to the video supply device serving as a supply source of the video; and a coordinate processing unit that defines a video corresponding to the touched position from the coordinate value acquired by the coordinate acquisition unit and acquires an acquisition state and a converted coordinate from the coordinate value for outputting the converted coordinate to the coordinate transmission unit and the acquisition state and the acquired coordinate to the video processing parameter control unit, wherein the video processing parameter control unit changes a video processing parameter of the video defined by the coordinate processing unit according to the acquisition state and an acquired coordinate value processed by the coordinate processing unit, and the coordinate transmission unit transmits the coordinate value converted by the coordinate processing unit to the video supply device serving as the supply source of the video defined by the coordinate processing unit.

In order to solve the aforementioned problem, a display method according to one aspect of the present invention is a display method of a multi-screen display apparatus provided with a touch panel including a display unit that displays videos supplied from a plurality of video supply devices on respectively different screens simultaneously; a multi-screen processing unit that processes the videos supplied from the video supply devices according to a display mode that defines the number of screens for simultaneous display on a display screen of the display unit and defines predetermined processing for the videos, and supplies to the display unit; a video processing parameter control unit that sets a video processing parameter for executing the display mode used for video processing in the multi-screen processing unit; a touch panel that is arranged so as to cover the display screen of the display unit; and a coordinate transmission unit that transmits the coordinate value to the video supply device serving as a supply source of the video, comprising: a coordinate acquisition step of acquiring, from a touched position on the touch panel, a coordinate value of the touched position; a video defining step of defining a video corresponding to the touched position from the coordinate value acquired by the coordinate acquisition step; a coordinate processing step of acquiring an acquisition state and a converted coordinate value from the coordinate value acquired by the coordinate acquisition step and outputting the converted coordinate value which is acquired to the coordinate transmission unit and the acquisition state and the acquired coordinate to the video processing parameter control unit; a video processing parameter change step of changing a video processing parameter of the video defined by the video defining step according to the acquisition state and an acquired coordinate value output by the coordinate processing step; and a coordinate transmission step of transmitting the converted coordinate value output by the coordinate processing step to the video supply device serving as a supply source of the video defined by the video defining step.

Advantageous Effects of Invention

According to one aspect of the present invention, an effect is exerted that a multi-screen display apparatus provided with a touch panel having excellent operability in which displacement between a coordinate of a touched position on a touch panel and a coordinate of a video which is displayed is not caused is able to be realized.

Moreover, according to one aspect of the present invention, an effect is exerted that video processing is able to be performed according to the touched position on the touch panel on a display apparatus side without transmitting a converted coordinate value of the video to a video supply device serving as a supply source of a defined video.

Furthermore, according to one aspect of the present invention, an effect is exerted that video processing of the display screen is able to be performed while maintaining operability which does not cause displacement for the coordinate of the displayed video.

BRIEF DESCRIPTION OF DRAWINGS

FIG. 21 is a view showing an example of an acquired coordinate and an acquisition state with respect to an acquisition time of a coordinate.

FIG. 22 is a view showing one example of a relation of a display mode, an input resolution, a video processing parameter, a display video and an acquired coordinate, and a converted coordinate.

DESCRIPTION OF EMBODIMENTS

Before explaining embodiments of the present invention, a technology serving as a premise of the present invention, that is, a display apparatus provided with a touch panel will be explained.

(Image Display Apparatus Provided with Touch Panel)

Figure 16:
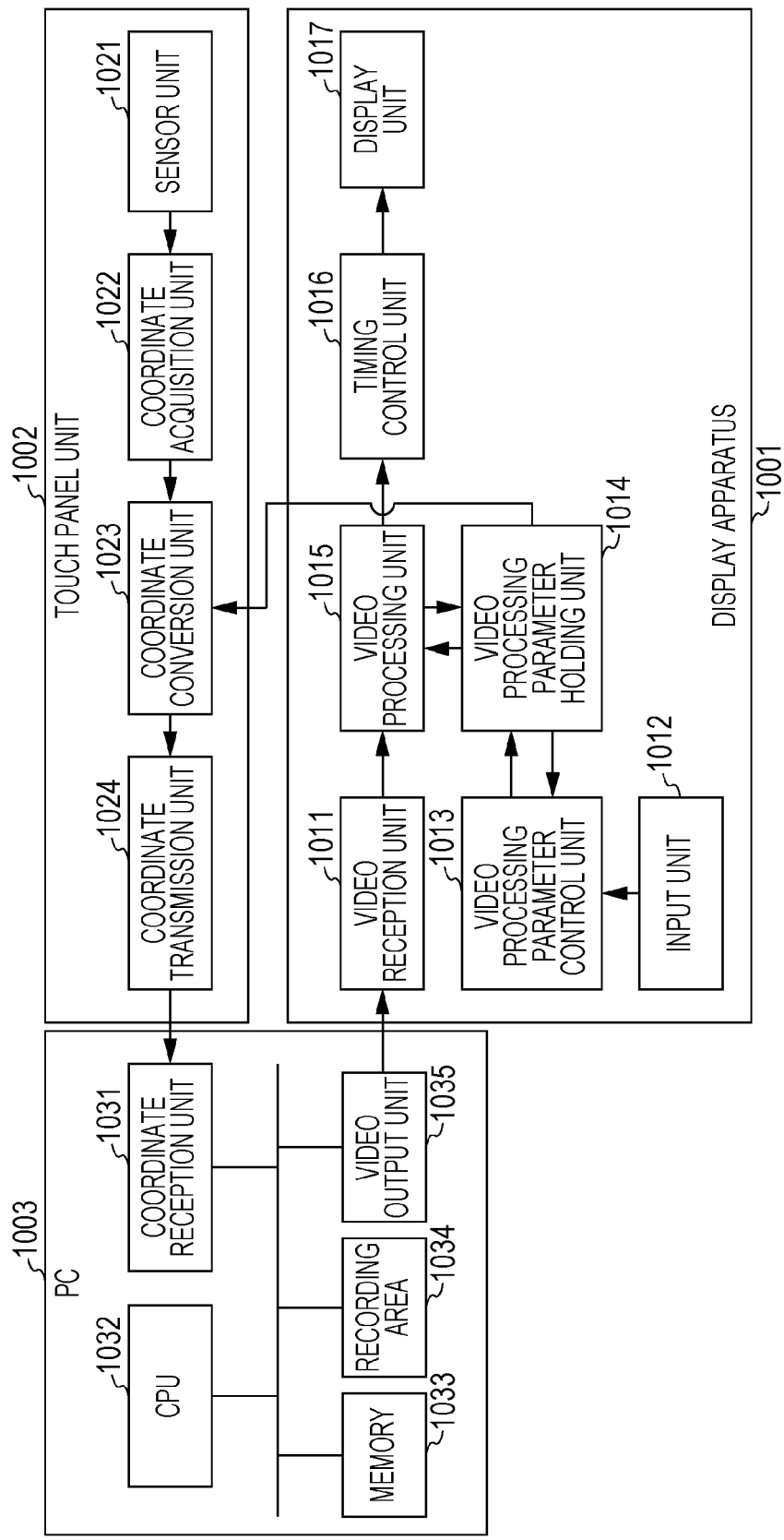
FIG. 16 is a schematic configuration block diagram of a display apparatus provided with a touch panel serving as a premise of the present invention.

FIG. 16 is a schematic configuration block diagram of a display apparatus provided with a touch panel.

The display apparatus provided with a touch panel is composed of a display apparatus 1001 for displaying a video and a touch panel 1002 which is arranged on a display screen (not shown) of the display apparatus 1001 as shown in FIG. 16.

The display apparatus provided with a touch panel is connected with a PC (personal computer) 1003 for supplying a video to the display apparatus 1001.

(Display Apparatus 1001)

The display apparatus 1001 includes a video reception unit 1011, an input unit 1012, a video processing parameter control unit 1013, a video processing parameter holding unit 1014, a video processing unit 1015, a timing control unit 1016 and a display unit 1017 as shown in FIG. 16.

In the display apparatus 1001, a video received by the video reception unit 1011 is subjected to video processing such as enlargement, reduction or display position adjustment at the video processing unit 1015. The video subjected to the video processing is transmitted to the display unit 1017 by adjusting a timing by the subsequent timing control unit 1016. The video subjected to the video processing is displayed on the display unit 1017.

A video processing parameter needed for the video processing in the video processing unit 1015 is held in the video processing parameter holding unit 1014. The video processing parameter and processing content at the video processing unit 1015 will be described in detail below.

Moreover, the input unit 1012 for selecting a display mode is mounted in the display apparatus 1001. An example of the input unit 1012 includes a display mode switching button. The display mode input at the input unit 1012 is transmitted to the video processing parameter control unit 1013, and control of the video processing parameter by acquiring the video processing parameter according to the display mode from the video processing parameter holding unit 1014 etc., is performed.

Here, as the display mode, there are an automatic zooming mode in which an input video is automatically enlarged in accordance with a display screen, a Dot by Dot mode in which an input video is displayed as it is, a rotational display mode in which an input video is rotated and displayed, and the like.

Moreover, in addition to the input unit 1012, an input unit capable of changing the video processing parameter directly from the PC 1003 or the like may be included. An example thereof includes a USB (Universal Serial Bus) connector.

(Touch Panel 1002)

The touch panel 1002 includes a sensor unit 1021, a coordinate acquisition unit 1022, a coordinate conversion unit 1023 and a coordinate transmission unit 1024 as shown in FIG. 16.

The sensor unit 1021 converts a position touched by a user on the touch panel 1002, that is, a touched position into an electric signal to transmit to the subsequent coordinate acquisition unit 1022.

The coordinate acquisition unit 1022 acquires a coordinate in the touch panel 1002 from the electric signal transmitted from the sensor unit 1021 to transmit to the subsequent coordinate conversion unit 1023.

The coordinate conversion unit 1023 converts the coordinate transmitted from the coordinate acquisition unit 1022 into a coordinate corresponding to a displayed video in accordance with the video processing parameter acquired from the video processing parameter holding unit 1014 of the display apparatus 1001 described above and transmits the converted coordinate to the subsequent coordinate transmission unit 1024.

The coordinate transmission unit 1024 transmits the converted coordinate which is transmitted from the coordinate conversion unit 1023 to the PC 1003.

(PC 1003)

The PC 1003 includes a coordinate reception unit 1031, a CPU 1032, a memory 1033, a recording area 1034 and a video output unit 1035 as shown in FIG. 16.

The coordinate reception unit 1031 receives the converted coordinate which is transmitted from the coordinate transmission unit 1024 of the touch panel 1002.

The CPU 1032 is to control operations in each unit of the PC 1003.

The memory 1033 is a memory in which various programs and data for control are stored.

The recording area 1034 is a recording area in which a video to be output is to be stored.

The video output unit 1035 is to output the video stored in the recording area 1034 to the display apparatus 1001 under control by the CPU 1032.

That is, in the PC 1003, the video corresponding to the converted coordinate which is received by the coordinate reception unit 1031 is read from the recording area 1034 and output to the display apparatus 1001 by the video output unit 1035.

(Coordinate Conversion Processing)

Here, description will be given below for coordinate conversion processing in the coordinate conversion unit 1023 of the touch panel 1002 with reference to FIG. 17 to FIG. 19.

Figures 17, 18:
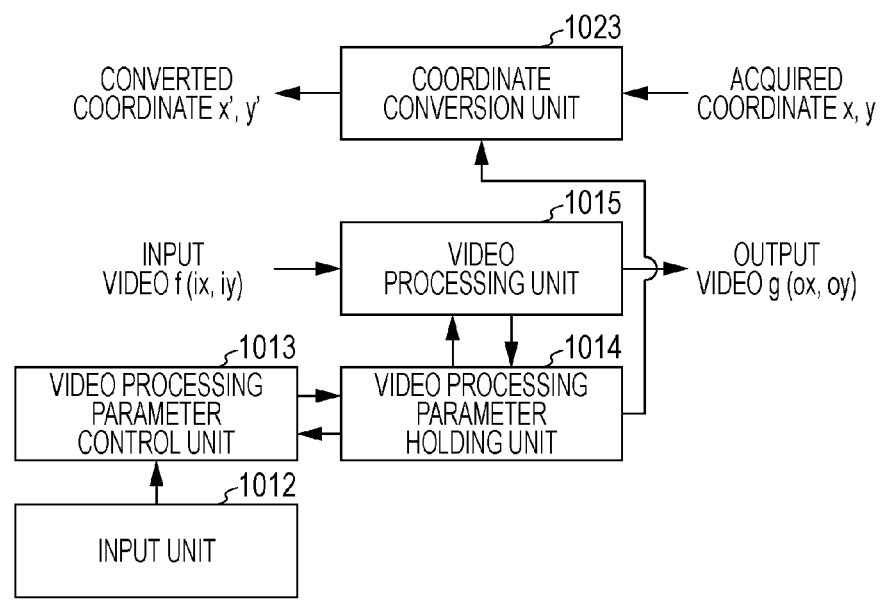
FIG. 17 is a schematic block diagram showing only a block which is used at a time of coordinate conversion in the display apparatus provided with a touch panel shown in FIG. 16.
FIGS. 18($a$) and ($b$) are views showing a coordinate conversion formula in a video processing unit.

FIG. 17 is a schematic block diagram showing only a block which is used at a time of coordinate conversion.

FIGS. 18(*a*) and (*b*) are views showing a coordinate conversion formula in the video processing unit.

Figure 19:
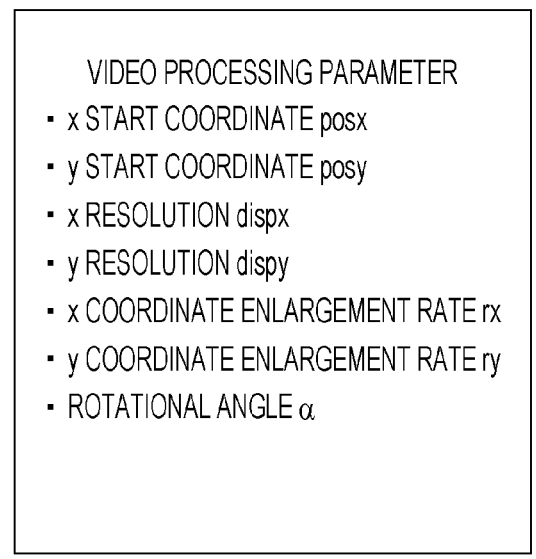
FIG. 19 is a view showing one example of video processing parameters.

FIG. 19 is a view showing one example of video processing parameters.

The video processing unit 1015 performs video processing by using a video processing parameter held in the video processing parameter holding unit 1014.

Here, the video processing unit 1015 acquires an x resolution and a y resolution of the video processing parameter by counting a data enable signal which is a synchronized signal of an input video f (ix, iy).

Moreover, the video processing parameter control unit 1013 calculates the video processing parameter in accordance with a display mode acquired from the input unit 1012 and changes a parameter of the video processing parameter holding unit 1014.

A coordinate conversion formula of the input video f (ix, iy) and an output video g (ox, oy) is able to be expressed like a formula (7) shown in FIG. 18(*a*). That is, interpolation processing such as a linear interpolation method is performed based on the formula (7) in the video processing unit 1015.

The coordinate conversion unit 1023 converts the coordinate acquired by the sensor unit 1021 (acquired coordinate x, y) by using the video processing parameter held in the video processing parameter holding unit 1014 and outputs a converted coordinate (converted coordinate x', y').

The conversion formula in the coordinate conversion unit 1023 is able to be expressed like a formula (8) shown in FIG. 18(*b*).

The video processing parameter in the formulas (7) and (8) shown in FIGS. 18(*a*) and (*b*) is shown in FIG. 19.

Figure 20:
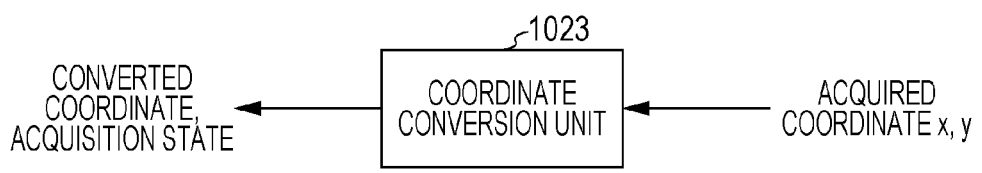
FIG. 20 is a block diagram for explaining processing of a coordinate conversion unit.

Further, the coordinate conversion unit 1023 may output an acquisition state together with the converted coordinate from the acquired coordinate x, y as shown in FIG. 20. Here, the acquisition state shows a state of an operation when a user touches the touch panel 1002 (such as touch-down and touch-up), and examples thereof include four types of acquisition states as follows. Moreover, FIG. 21 is a view showing an example of an acquired coordinate and an acquisition state with respect to an acquisition time of a coordinate. In FIG. 21, (*) indicates being undefined that the acquired coordinate and the acquisition state are not defined.

1. TOUCH DOWN
2. TOUCH UP
3. TOUCH MOVE
4. DBLCK TOUCH

The TOUCH DOWN shows a case of touching a sensor surface of the touch panel 1002. In this case, a value of the acquired coordinate is changed from undefined (*) to defined.

The TOUCH UP shows a case of being separated from the sensor surface of the touch panel 1002. In this case, the value of the acquired coordinate is changed from defined to undefined (*).

The TOUCH MOVE shows a case where the defined value of the acquired coordinate changes. This operation corresponds to dragging of a mouse.

The DBLCK TOUCH shows a case where the value of the acquired coordinate is changed as defined, undefined (*) and defined at a certain interval. This operation corresponds to double-clicking of the mouse.

Moreover, there is also a case where the touch panel 1002 processes a plurality of touched positions simultaneously. In this case, an input number is output together with the coordinate value.

Further, when the sensor unit of the touch panel 1002 is touched with two fingers, two acquired coordinates which are relatively close are to be acquired. In this case, the two converted coordinates may not be output but one converted coordinate and an acquisition state which is different from the above may be output.

For example, in the case of touching with two fingers, following acquisition states may be output.

5. TOUCH2 DOWN
6. TOUCH2 UP
7. TOUCH2 MOVE
8. DBLCK2 TOUCH

The TOUCH2 DOWN shows a case where the sensor unit of the touch panel 1002 is touched with two fingers. The same is also applied to the TOUCH2 UP and the TOUCH2 MOVE and the DBLCK2 TOUCH.

(Relation Between Display Mode and Video Processing Parameter)

FIG. 22 is a view showing one example of a relation of a display mode, an input resolution, a video processing parameter, a display video and an acquired coordinate, and a converted coordinate.

In this manner, depending on the display mode which is executed in the display apparatus 1001, the video processing parameter varies. Moreover, the acquired coordinate is converted with the video processing parameter.

For example, in FIG. 22, when the display mode is an automatic zooming mode, the input resolution is 3840×2160, the video processing parameter is rx=1, ry=1, posx=0, posy=0 and α=0°, the acquired coordinate is (x, y)=(2560, 720), and the converted coordinate is (x', y')=(2560, 720).

As above, according to the display apparatus provided with a touch panel shown in FIG. 16, since conversion of the acquired coordinate is performed by using the video processing parameter according to the display mode, it becomes unnecessary to perform positioning (calibration) in the PC 1003 on a side where a video is output each time the display mode is switched.

By applying this technology to a multi-screen display apparatus, it is also possible to realize a multi-screen display apparatus provided with a touch panel. Description will be given below for a multi-screen display apparatus provided with a touch panel of the present invention by taking each embodiment as an example.

Embodiment 1

One embodiment of the present invention will be described below.

(Multi-Screen Display Apparatus Provided with Touch Panel)

Figure 1:
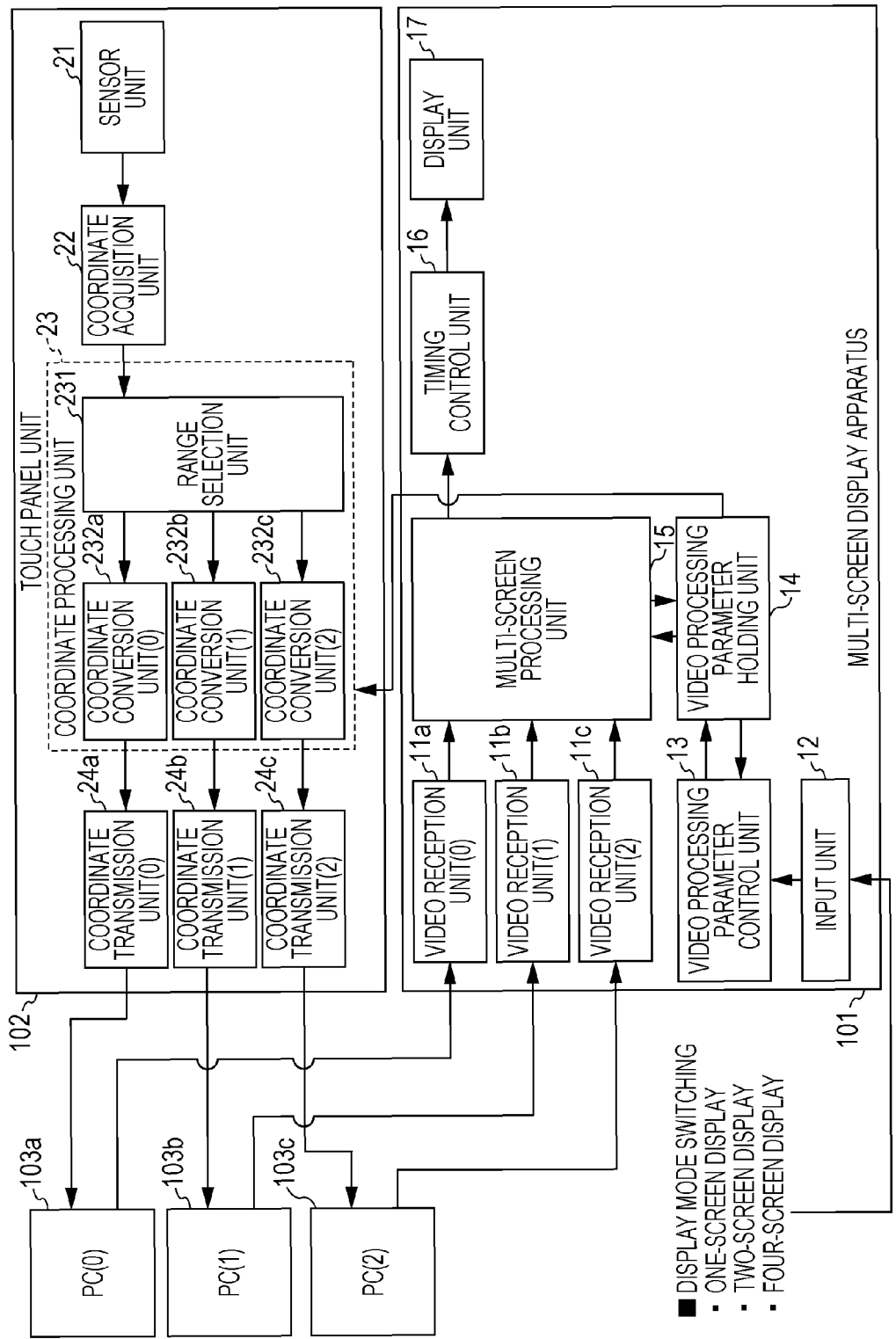
FIG. 1 is a schematic configuration block diagram of a multi-screen display apparatus provided with a touch panel according to the present embodiment.

FIG. 1 is a schematic configuration block diagram of a multi-screen display apparatus provided with a touch panel according to the present embodiment.

The multi-screen display apparatus provided with a touch panel is composed of a multi-screen display apparatus 101 for displaying a video and a touch panel unit 102 which is arranged on a display screen (not shown) of the multi-screen display apparatus 101 as shown in FIG. 1.

The multi-screen display apparatus provided with a touch panel is connected with three PCs(0) 103a to (2) 103c as video supply devices for supplying videos to the multi-screen display apparatus 101.

As above, in the present embodiment, description will be given for an example that videos are displayed on the multi-screen display apparatus 101 by using the PCs which are three different video supply sources.

(Multi-Screen Display Apparatus 101)

The multi-screen display apparatus 101 includes three video reception units(0) 11a to (2) 11c corresponding to the respective three PCs(0) 103a to (2) 103c, an input unit 12, a video processing parameter control unit 13, a video processing parameter holding unit 14, a multi-screen processing unit 15, a timing control unit 16 and a display unit 17 as shown in FIG. 1.

The video reception unit(0) 11a receives a video from the PC (0) 103a serving as the video supply source, the video reception unit(1) 11b receives a video from the PC(1) 103b serving as the video supply source, the video reception unit(2) 11c receives a video from the PC(2) 103c serving as the video supply source, and each of the received videos is transmitted to the multi-screen processing unit 15.

The input unit 12 is a switch button for switching a display mode, and transmits the display mode which is switched to the video processing parameter control unit 13.

The video processing parameter control unit 13 converts a video processing parameter according to the display mode based on an instruction signal which is input to the input unit 12 to transmit to the video processing parameter holding unit 14.

Specifically, the video processing parameter control unit 13 changes the video processing parameter by the display mode of the input unit 12 and various parameters which are input directly from the PC and the like.

Figure 3:
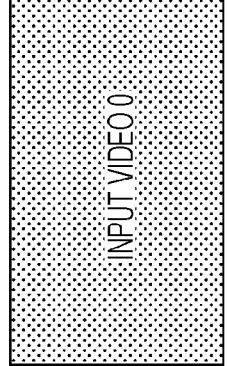
FIG. 3 is a view showing one example of display modes.

Note that, in the present embodiment, as the display mode, there are nine types of display modes which are obtained by adding one-screen display, two-screen display and four-screen display to each of three types of automatic zooming, Dot by Dot and rotational display (refer to FIG. 3). That is, there are nine types of display modes in total, including three types of display modes of the automatic zooming, the Dot by Dot and the rotational display in the case of the one-screen display, three types of display modes of the automatic zooming, the Dot by Dot and the rotational display in the case of the two-screen display, and three types of display modes of the automatic zooming, the Dot by Dot and the rotational display in the case of the four-screen display.

Switching of these nine types of display modes is performed by the instruction signal which is input to the input unit 12.

Note that, though description will be given by assuming the nine types of display modes as the display modes in the present embodiment and embodiment 2 and 3 described below, the display modes are not limited thereto.

The video processing parameter holding unit 14 is to hold the video processing parameter which is converted according to the display mode by the video processing parameter control unit 13, which is read as necessary by the multi-screen processing unit 15.

The multi-screen processing unit 15 is to perform synchronization, enlargement/reduction processing and superimposing processing of videos which are input from the three video reception units(0) 11a to (2) 11c by using the video processing parameter held in the video processing parameter holding unit 14.

Video data processed by the multi-screen processing unit 15 is transmitted to the subsequent timing control unit 16.

The timing control unit 16 adjusts a timing for the video data and outputs this video data to the display unit 17.

The display unit 17 displays a video based on the input video data. This display unit 17 is capable of multi-screen display in which videos supplied from a plurality of video supply devices (PC(0) to PC(2) described below) are displayed on respectively different screens simultaneously. The number of the videos for simultaneous display varies depending on the display mode. For example, one screen is displayed in the one-screen display mode, two screens are displayed simultaneously in the two-screen display mode, and four screens are displayed simultaneously in the four-screen display mode.

That is, the multi-screen processing unit 15 is to process the videos supplied from the video supply devices (PC(0) to PC(2) described below) according to the display mode which defines the number of screens for simultaneous display on a display screen of the display unit 17 to supply to the display unit 17.

(Touch Panel Unit 102)

The touch panel unit 102 includes a sensor unit (touch panel) 21, a coordinate acquisition unit 22, a coordinate processing unit 23 and three coordinate transmission units (0) 24a to (2) 24c as shown in FIG. 1.

The sensor unit 21 is arranged so as to cover the display screen of the display unit 17 of the multi-screen display apparatus 101 and is to detect a touched position by a user. Specifically, the sensor unit 21 detects an electric signal which is generated by the touching of the user.

The coordinate acquisition unit 22 is to acquire, from the touched position detected by the sensor unit 21, a coordinate value of this touched position. Specifically, the coordinate acquisition unit 22 acquires the coordinate value of the touched position from the electric signal detected by the sensor unit 21.

The coordinate processing unit 23 is to define a video corresponding to this touched position from the coordinate value acquired by the coordinate acquisition unit 22 and the display mode which is input to the multi-screen display apparatus 101 and convert the coordinate value into a coordinate value in the defined video.

The coordinate processing unit 23 includes a range selection unit (video defining unit) 231 that defines a video corresponding to this touched position from the coordinate value acquired by the coordinate acquisition unit 22 and the display mode, and coordinate conversion units(0) 232*a* to (2) 232*c* that convert the coordinate value into a coordinate value in the defined video.

The range selection unit 231 selects the coordinate conversion unit(0) 232*a* to (2) 232*c* as a transmission destination of the acquired coordinate value by the acquired coordinate value and the video processing parameter. Specifically, it is adapted so that the coordinate conversion unit(0) 232*a* to (2) 232*c* corresponding to the video supply device PC(0) to PC(2) serving as the supply source of the defined video is selected and the coordinate value is output to the selected coordinate conversion unit(0) 232*a* to (2) 232*c*.

The coordinate transmission units(0) 24*a* to (2) 24*c* are to respectively transmit the coordinate values transmitted from the corresponding coordinate conversion units(0) 232*a* to (2) 232*c* to the corresponding PC(0) 103*a* to PC(2) 103*c* as the video supply devices.

(Video Supply Device)

Each of the PC(0) 103*a* to PC(2) 103*c* as the video supply devices has the same configuration as that of the PC 1003 of FIG. 16, for example.

Therefore, each of the PC(0) 103*a* to PC(2) 103*c* is to perform the same operation as that of the PC 1003 and transmit the video which is finally processed to each of the corresponding video reception units.

Note that, as described above, since each of the PC(0) 103*a* to PC(2) 103*c* has the same configuration as that of the PC 1003 of FIG. 16, for example, detailed description thereof will be omitted.

(Video Processing Parameter)

Figure 2:
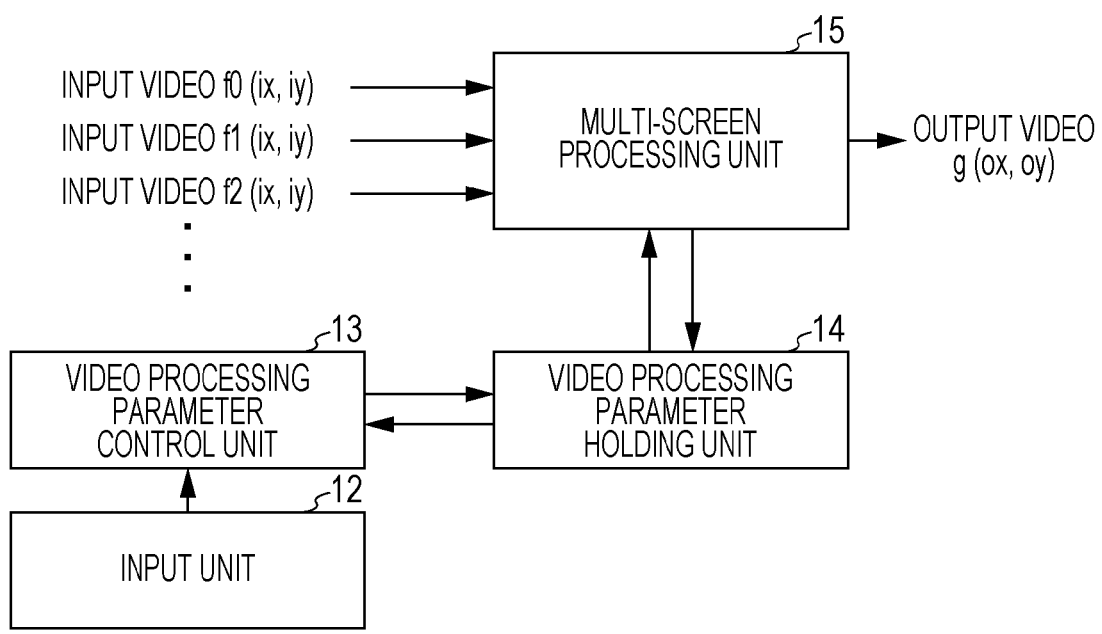
FIG. 2 is a view schematically showing video processing in a multi-screen processing unit 15.

FIG. 2 is a view schematically showing video processing in the multi-screen processing unit 15.

The multi-screen processing unit 15 is to output input videos f0 (ix, iy), f1 (ix, iy) and f2 (ix, iy), . . . as an output video g (ox, oy) by the video processing parameter held in the video processing parameter holding unit 14.

The video processing parameter held in the video processing parameter holding unit 14 is a video processing parameter which is set and controlled by the video processing parameter control unit 13.

The video processing parameter control unit 13 is to set the video processing parameter corresponding to the display mode (FIG. 3) input from the input unit 12.

The video processing parameter held in the video processing parameter holding unit 14 is also used for the coordinate conversion processing in the coordinate processing unit 23 described above.

Figure 4:
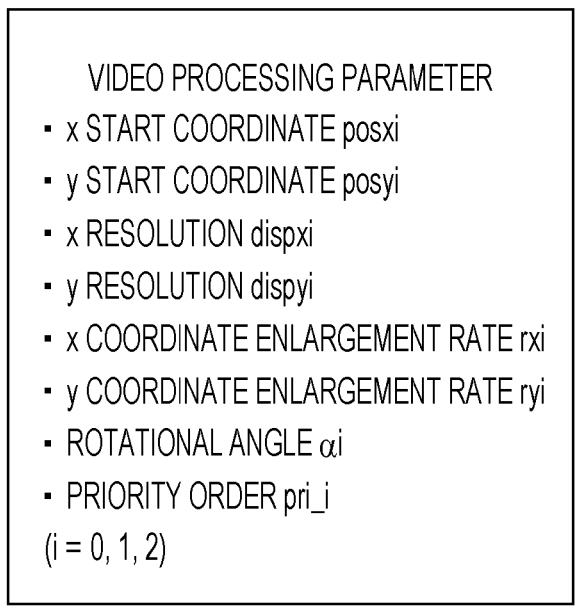
FIG. 4 is a view showing one example of video processing parameters.
Figure 5:
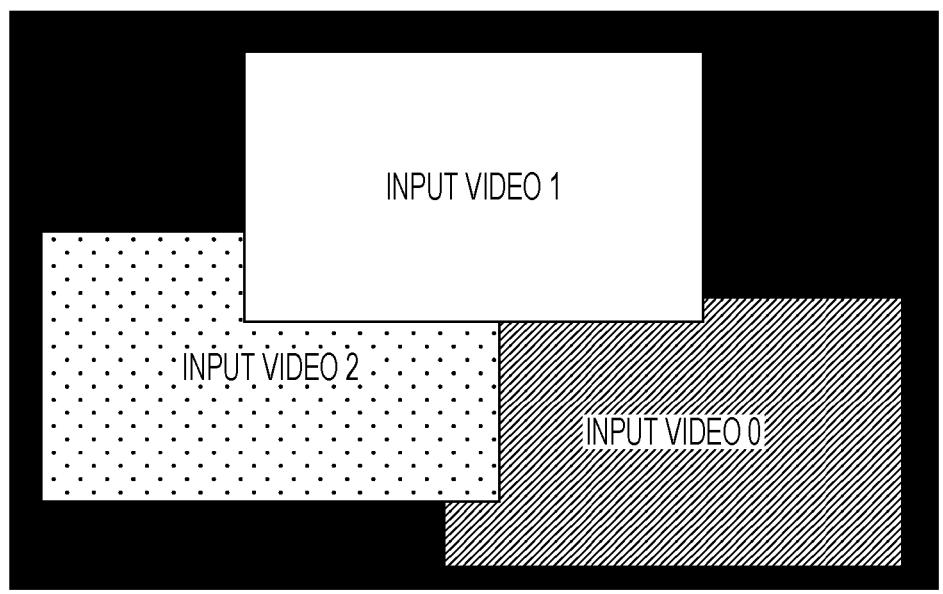
FIG. 5 is a view showing a display example of a plurality of input videos according to a priority order.

One example of video processing parameters is shown in FIG. 4. Each parameter exists in numbers of input videos. Here, description will be given for a priority order pri_i (i=0, 1, 2) which is one of the parameters. This parameter represents a priority order of display screens, and holds input video numbers of the display screens. When pri_0=1, pri_1=2 and pri_2=0, as shown in FIG. 5, the display screen having the highest priority order is an input video 1, and the screens therebelow are an input video 2 and an input video 0.

Further, one example of display modes is shown in FIG. 3. Here, as an example of the display modes, one-screen display, two-screen display and four-screen display, and automatic zooming, Dot by Dot and rotational display according to the number of the display screens are shown.

By changing the video processing parameter directly by the PC or the like from the input unit 12, screen display is allowed.

Figure 6:
FIG. 6 is a view showing an example that a display mode is associated with a video processing parameter.

An example that a display mode and a video processing parameter are associated with each other is shown in FIG. 6. Here, screen display positions and each video processing parameter of the two-screen display and the four-screen display are shown.

(Range Selection Processing)

Figure 7:
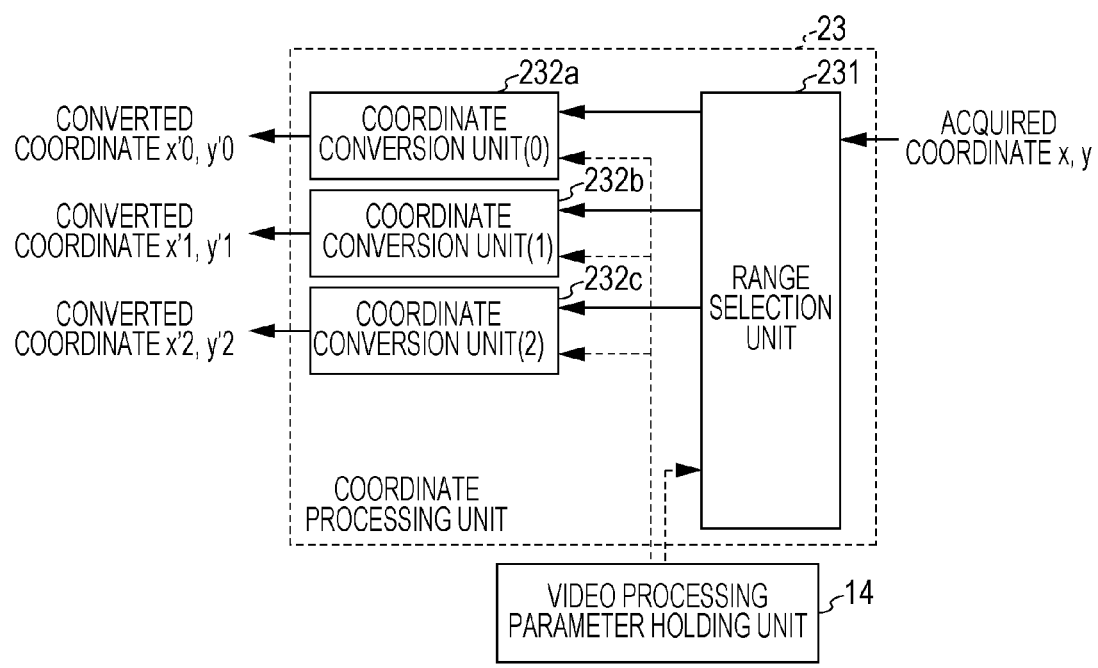
FIG. 7 is a schematic configuration block diagram of a coordinate processing unit.

FIG. 7 is a schematic configuration block diagram of the coordinate processing unit 23.

The coordinate processing unit 23 includes the range selection unit 231 and the coordinate conversion units(0) 232*a* to (2) 232*c* as described above.

The range selection unit 231 selects the coordinate conversion unit(0) 232*a* to (2) 232*c* as a transmission destination of the acquired coordinate (x, y) by the acquired coordinate (x, y) and the video processing parameter as shown in FIG. 7.

Figure 8:
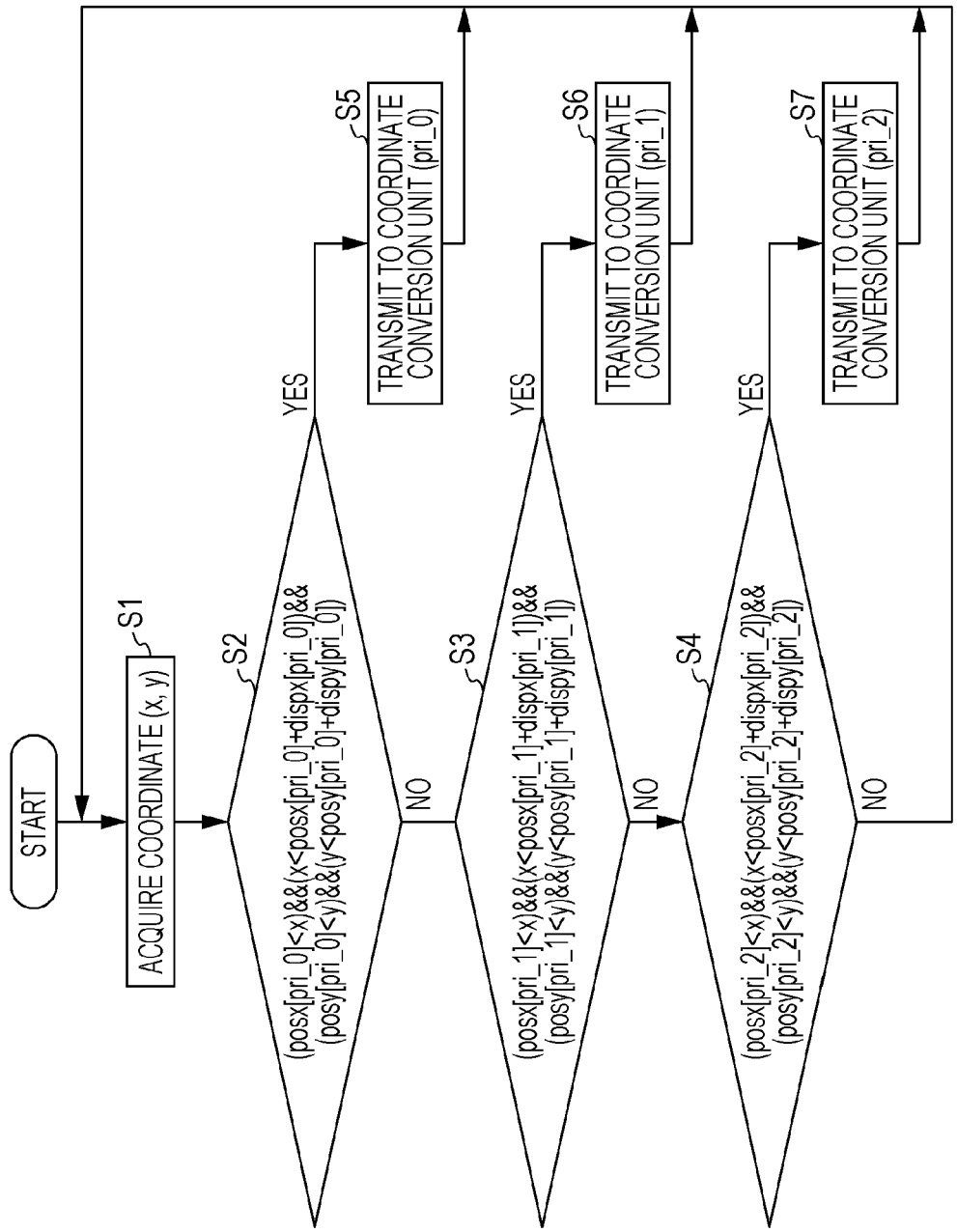
FIG. 8 is a flowchart showing a flow of range selection processing in a range selection unit.

Here, a flowchart of the range selection unit 231 is shown in FIG. 8. In a condition formula, in the case of pri_0=1, posx[pri_0]=posx1 is expressed.

First, a coordinate (x, y) is acquired (step S1).

Whether or not the coordinate (x, y) satisfies a following formula (1) is judged (step S2).

Here, when the coordinate (x, y) satisfies the following formula (1), this coordinate value is transmitted to the coordinate conversion unit(0) 232*a* by moving to step S5.

[Expression 1]

$$(posx[pri\_0]<x)\&\&(x<posx[pri\_0]+dispx[pri\_0])\&\& \\ (posy[pri\_0]<y)\&\&(y<posy[pri\_0]+dispy \\ [pri\_0]) \quad (1)$$

On the other hand, when the coordinate (x, y) does not satisfy the formula (1) at step S2, whether or not a formula (2) is satisfied is further judged (step S3).

Here, when the coordinate (x, y) satisfies the following formula (2), this coordinate value is transmitted to the coordinate conversion unit 1 by moving to step S6.

[Expression 2]

$$(posx[pri\_1]<x)\&\&(x<posx[pri\_1]+dispx[pri\_1])\&\& \\ (posy[pri\_1]<y)\&\&(y<posy[pri\_1]+dispy \\ [pri\_1]) \quad (2)$$

On the other hand, when the coordinate (x, y) does not satisfy the formula (2) at step S3, whether or not a formula (3) is satisfied is further judged (step S4).

Here, when the coordinate (x, y) satisfies the following formula (3), this coordinate value is transmitted to the coordinate conversion unit 2 by moving to step S7.

[Expression 3]

$$(posx[pri\_2]<x)\&\&(x<posx[pri\_2]+dispx[pri\_2])\&\& \\ (posy[pri\_2]<y)\&\&(y<posy[pri\_2]+dispy \\ [pri\_2]) \quad (3)$$

On the other hand, when the coordinate (x, y) does not satisfy the formula (3) at step S4, coordinate acquisition is performed again (step S1).

(Explanation of Effect)

Description will be given below for an effect in the present embodiment with reference to FIG. 9.

Figure 9:
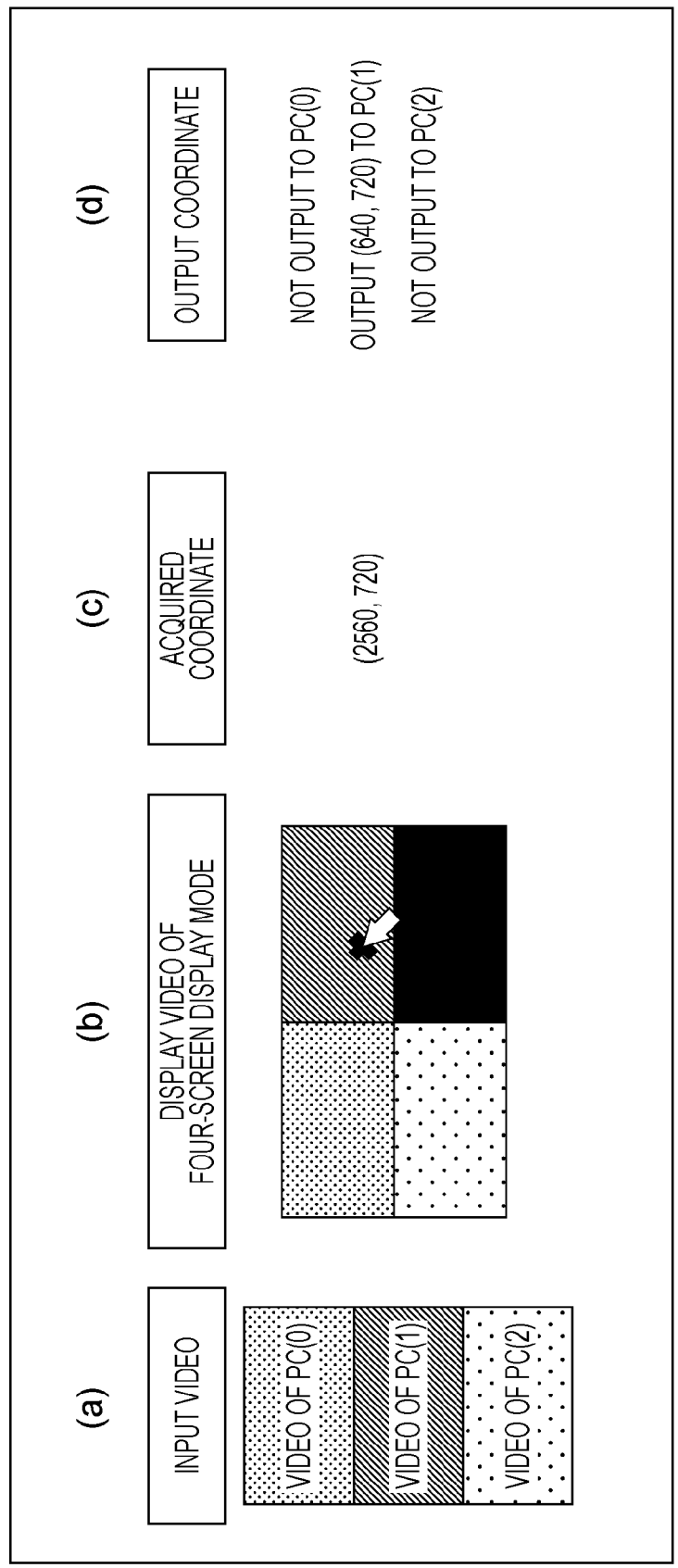
FIG. 9 is a view for explaining an effect in the present embodiment.

In a case where there are three input videos (video of PC(0), video of PC(1) and video of PC(2)) as shown in FIG. 9(*a*) and a display mode is four-screen display as shown in FIG. 9(b), when an acquired coordinate is (2560, 720) as shown in FIG. 9(c), a coordinate value (2560, 720) is output to the PC(1) as shown in FIG. 9(d). That is, this coordinate value is not output to the PC(0) or the PC(2).

Here, a coordinate conversion formula is the formula (2) shown in FIG. 18(b) described above.

In this manner, according to the present embodiment, each time the display mode is switched, selection of the PC as an output destination and calibration of each PC become unnecessary.

Further, by displaying a plurality of screens simultaneously, it is possible to perform touch input while seeing another screen.

Furthermore, it is possible to perform touch input to a plurality of PCs simultaneously by multi-touch input.

Note that, though the coordinate processing unit having a function of transmitting a coordinate to a certain coordinate conversion unit (individual processing mode) has been explained in the present embodiment, a coordinate processing unit with a function of transmitting a coordinate to all PCs of videos which are superimposed at a touch input position (simultaneous processing mode) will be described in a following embodiment 2.

Embodiment 2

Another embodiment of the present invention will be described below. Note that, same reference numerals are assigned to members having same functions as those of the embodiment 1 and detailed description thereof will be omitted.

Figure 10:
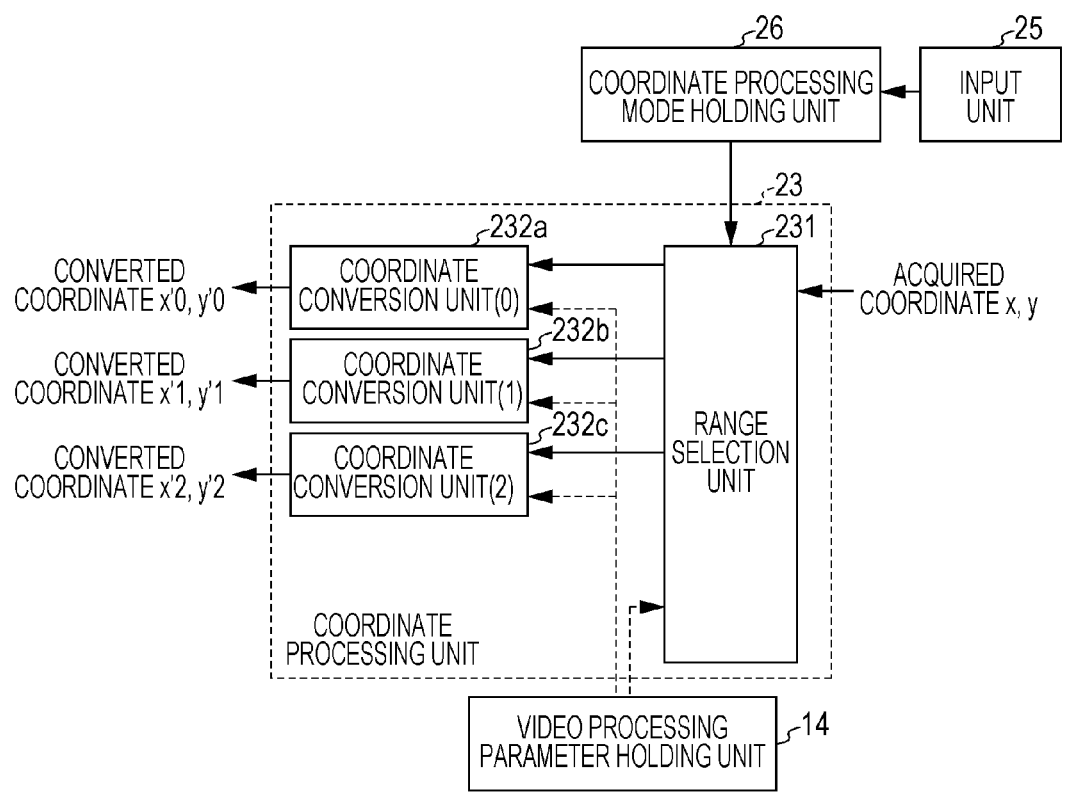
FIG. 10 is a schematic configuration block diagram of the coordinate processing unit according to the present embodiment.

FIG. 10 is a schematic configuration block diagram of the coordinate processing unit 23 according to the present embodiment.

The coordinate processing unit 23 of the present embodiment is basically the same as the coordinate processing unit 23 described in FIG. 7 of the embodiment 1, but is different in terms of considering a coordinate processing mode when a range is selected by the range selection unit 231.

Thereby, as shown in FIG. 10, an input unit 25 (mode switching means) and a coordinate processing mode holding unit 26 that holds a coordinate processing mode are newly provided.

Here, the coordinate processing modes include the individual processing mode explained in the embodiment 1 and a simultaneous processing mode explained in the present embodiment 2.

Then, a user is able to switch the individual processing mode and the simultaneous processing mode by operating the input unit 25 which is the mode switching means as necessary.

Figure 11:
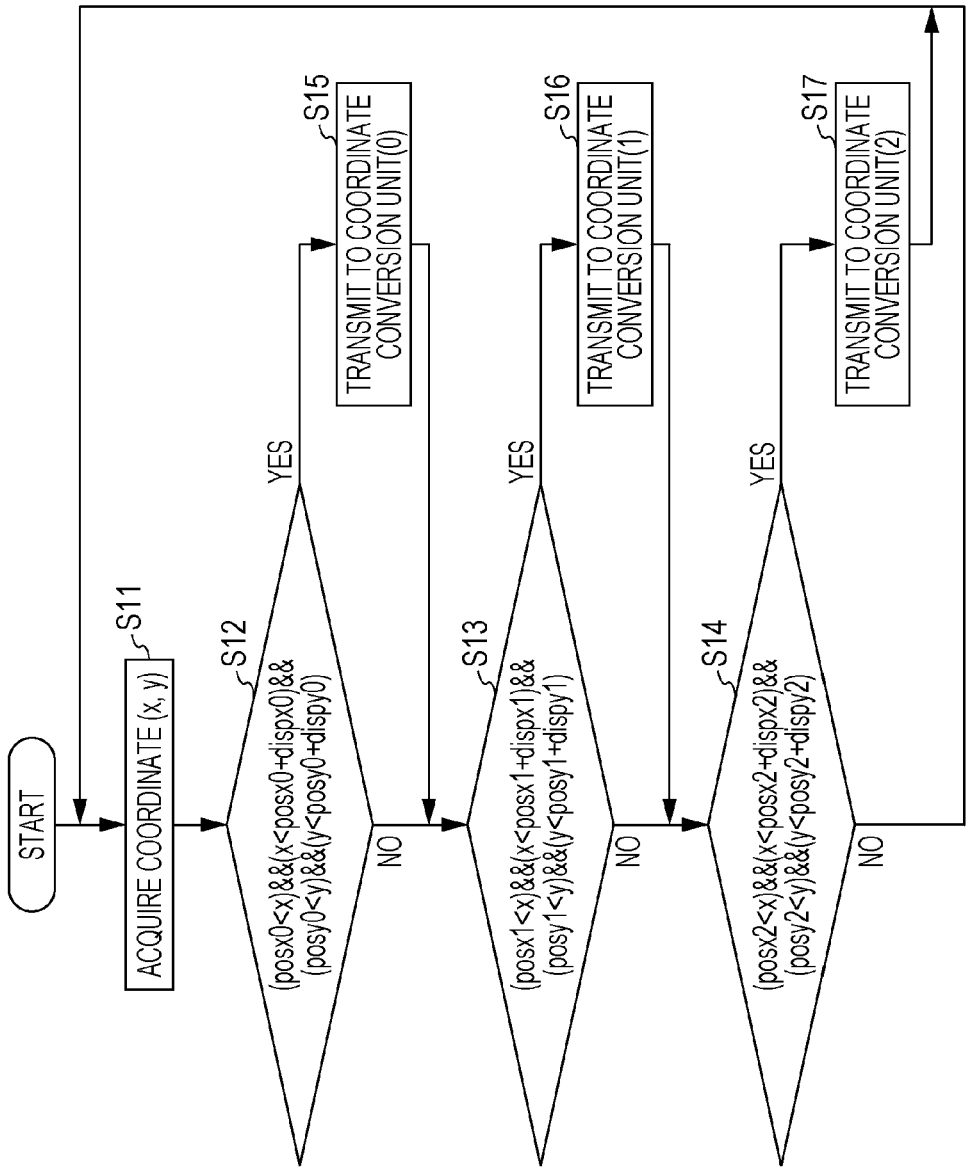
FIG. 11 is a flowchart showing a flow of range selection processing of the range selection unit in a simultaneous conversion mode.

FIG. 11 is a flowchart showing a flow of range selection processing of the range selection unit 231 in the simultaneous processing mode.

In the simultaneous processing mode, when a plurality of screens are displayed being superimposed, a touch input coordinate is able to be transmitted even to a screen of which a video is superimposed beneath, that is, which has a low priority.

(Range Selection Processing)

FIG. 11 is a flowchart showing a flow of range selection processing in the simultaneous conversion mode.

First, a coordinate (x, y) is acquired (step S11).

Whether or not the coordinate (x, y) satisfies a following formula (4) is judged (step S12).

Here, when the coordinate (x, y) satisfies the following formula (4), this coordinate value is transmitted to the coordinate conversion unit 0 by moving to step S15, followed by moving to step S13.

[Expression 4]

$$(posx0<x) \&\& (x<posx0+dispx0) \&\& (posy0<y) \&\& (y<posy0+dispy0) \quad (4)$$

On the other hand, when the coordinate (x, y) does not satisfy the formula (4) at step S12, whether or not a formula (5) is satisfied is further judged (step S13).

Here, when the coordinate (x, y) satisfies the following formula (5), this coordinate value is transmitted to the coordinate conversion unit 1 by moving to step S16, followed by moving to step S14.

[Expression 5]

$$(posx1<x) \&\& (x<posx1+dispx1) \&\& (posy1<y) \&\& (y<posy1+dispy1) \quad (5)$$

On the other hand, when the coordinate (x, y) does not satisfy the formula (5) at step S13, whether or not a formula (6) is satisfied is further judged (step S14).

Here, when the coordinate (x, y) satisfies the following formula (6), this coordinate value is transmitted to the coordinate conversion unit 2 by moving to step S17.

[Expression 6]

$$(posx2<x) \&\& (x<posx2+dispx2) \&\& (posy2<y) \&\& (y<posy2+dispy2) \quad (6)$$

On the other hand, when the coordinate (x, y) does not satisfy the formula (6) at step S14, coordinate acquisition is performed again (step S11).

(Explanation of Effect)

Figure 12:
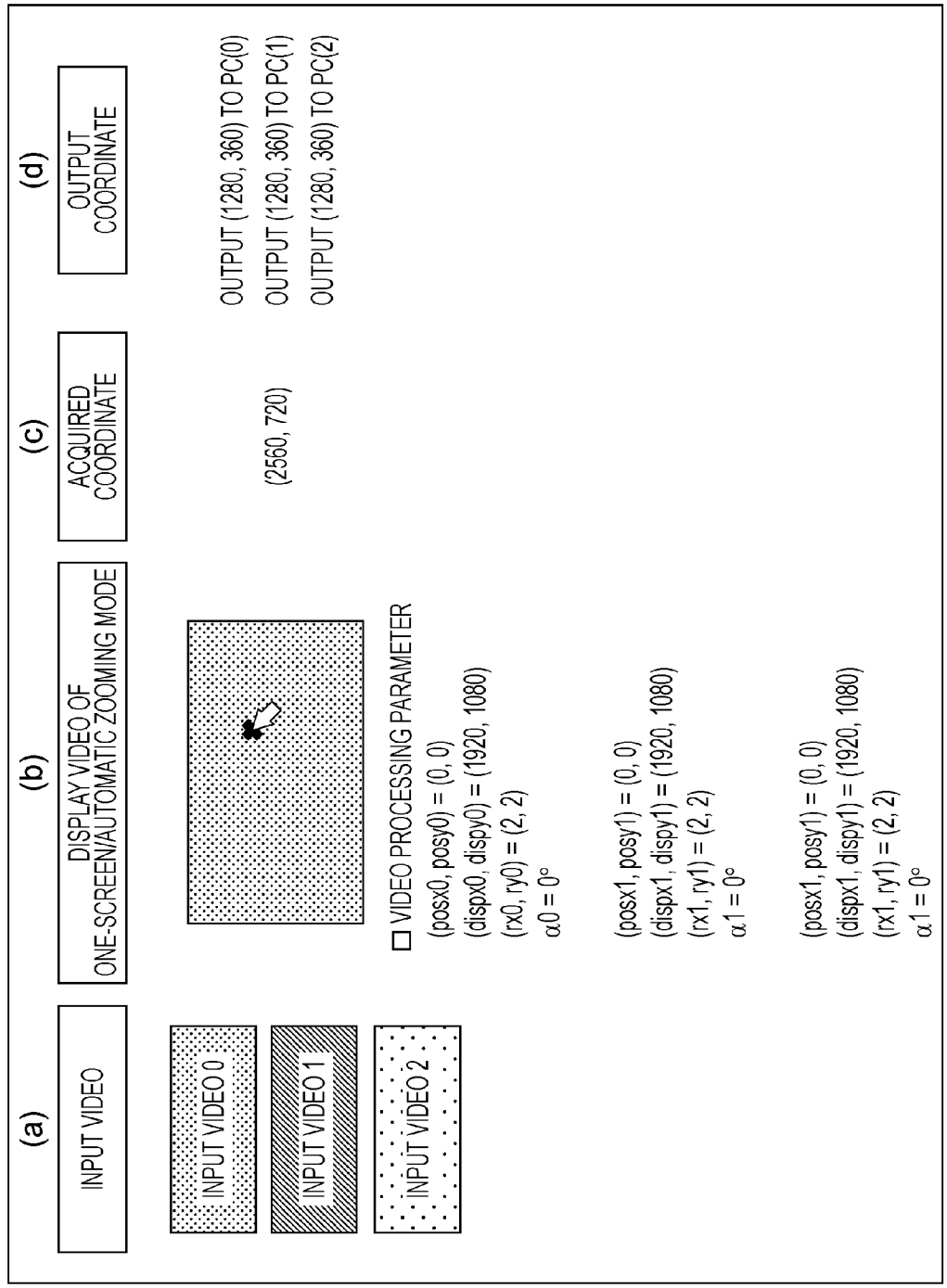
FIG. 12 is a view for explaining an effect in the present embodiment.

Description will be given below for an effect in the present embodiment with reference to FIG. 12.

When there are three input videos (input video 0, input video 1 and input video 2) as shown in FIG. 12(a) and a display mode is one-screen display as shown in FIG. 12(b), a video processing parameter at this time is shown. Here, though the input video 1 and the input video 2 are not displayed, the parameter is set as described therein. The parameter shows being superimposed under a screen.

When an acquired coordinate is (2560, 720) as shown in FIG. 12(c), a coordinate value (1280, 360) is output to all the PC0 to PC2 as shown in FIG. 12(d).

Here, a coordinate conversion formula is the formula (2) shown in FIG. 18(b) described above.

According to the present embodiment, it is possible to perform touch input to a plurality of PCs simultaneously.

In both of the embodiments 1 and 2, a coordinate value acquired from a touched position is converted into a coordinate value of a video corresponding to the touched position, which is then transmitted to the PC(0) to PC(2) serving as the video supply devices, and a video subjected to video processing by considering the converted coordinate value is transmitted again to the multi-screen display apparatus 101 from the PC(0) to PC(2), thereby the video corresponding to a touch operation of a user is displayed.

In an embodiment 3 below, however, a coordinate value acquired by the sensor unit 21 (coordinate value before conversion) is transmitted to the video processing parameter control unit 13 that controls the video processing parameter of the multi-screen display apparatus 101 and the video processing parameter is changed, thereby the video corresponding to the touch operation of the user is displayed.

Embodiment 3

Another embodiment of the present invention will be described below. Note that, same reference numerals are assigned to members having same functions as those of the embodiment 1 and detailed description thereof will be omitted.

Figure 13:
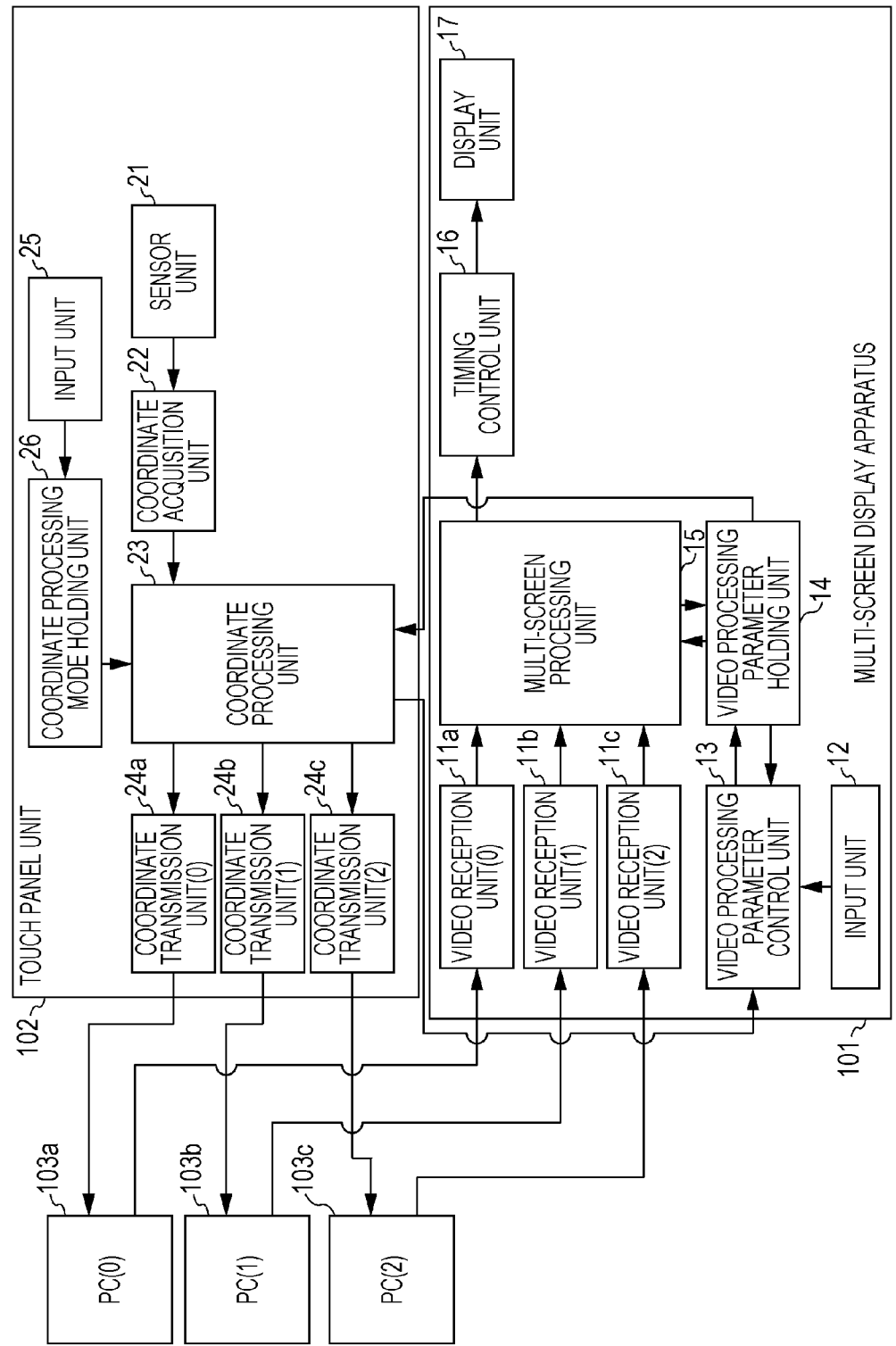
FIG. 13 is a schematic configuration block diagram of the multi-screen display apparatus provided with a touch panel according to the present embodiment.

FIG. 13 is a schematic configuration block diagram of the multi-screen display apparatus provided with a touch panel according to the present embodiment.

It is different from the embodiments 1 and 2 in that the video processing parameter control unit 13 is added as an output destination of the coordinate processing unit 23.

In the present embodiment, description will be given for the coordinate processing unit 23 that has a function of changing a video processing parameter by a coordinate acquired by the sensor unit 21.

As the coordinate processing mode of the coordinate processing unit 23, a video processing parameter change mode which is a mode for changing a video processing parameter in accordance with an acquired coordinate is added.

The coordinate processing unit 23 in this video processing parameter change mode transmits an acquired coordinate and an acquisition state to the video processing parameter control unit 13. Here, as described above, there are four types of the acquisition states, including

1. TOUCH DOWN
2. TOUCH UP
3. TOUCH MOVE
4. DBLCK TOUCH.

The video processing parameter control unit 13 determines a method for calculating a video processing parameter in accordance with the acquisition state and calculates the video processing parameter in accordance with the acquired coordinate. Then, the video processing parameter which is acquired by the calculation is transmitted to the video processing parameter holding unit 14.

Accordingly, in this video processing parameter change mode, the coordinate value is not transmitted to the PC(0) to PC(2).

(Video Processing Parameter Change Processing)

Figure 14:
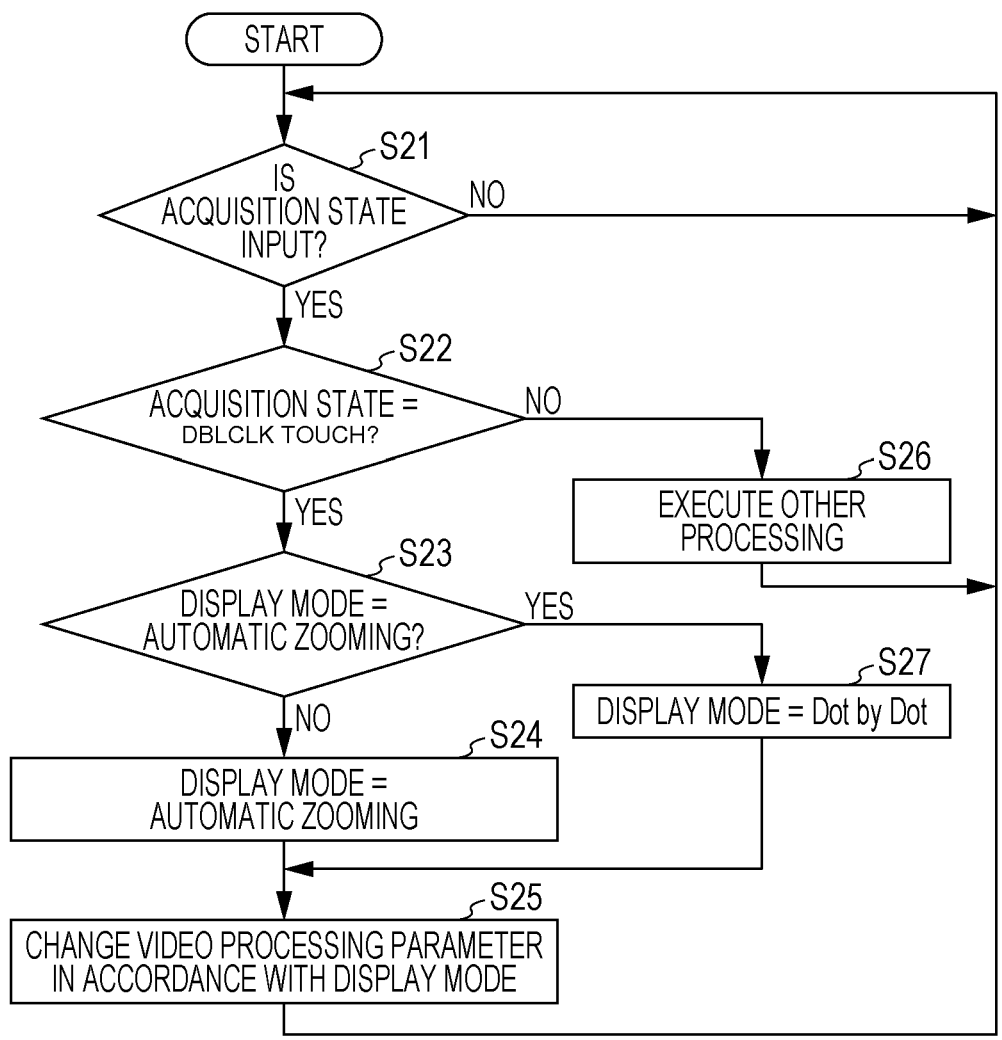
FIG. 14 is a flowchart showing a flow of processing for changing a video processing parameter in a video processing parameter control unit when the coordinate processing unit has a video processing parameter change mode.

FIG. 14 is a flowchart showing a flow of processing for changing a video processing parameter in the video processing parameter control unit 13 when the coordinate processing unit 23 has the video processing parameter change mode. In this flowchart, when the acquisition state is 4. DBLCK TOUCH (that is, in the case of a state where the sensor unit 21 is double-clicked), the automatic zooming mode and the Dot by Dot mode are switched.

That is, when the acquisition state is input (step S21), the video processing parameter control unit 13 judges whether or not the acquisition state is DBLCK TOUCH (step S22).

Here, when the acquisition state is DBLCK TOUCH, whether or not a display mode is the automatic zooming is judged (step S23). Here, when the display mode is not the automatic zooming, the display mode is the Dot by Dot mode, and therefore the display mode is set to the automatic zooming (step S24) and a video processing parameter is changed in accordance with the display mode (step S25).

On the other hand, when the acquisition state is not DBLCK TOUCH at step S22, other processing is executed (step S26) and input of an acquisition state is waited for by moving to step S21 again.

Alternatively, when the display mode is the automatic zooming at step S23, the display mode is switched and set to the Dot by Dot mode (step S27), and the video processing parameter is changed in accordance with the display mode (step S25).

When step S25 is finished, input of an acquisition state is waited for by moving to step S21 again.

(Explanation of Effect)

Description will be given below for an effect in the present embodiment with reference to FIG. 15.

Figure 15:
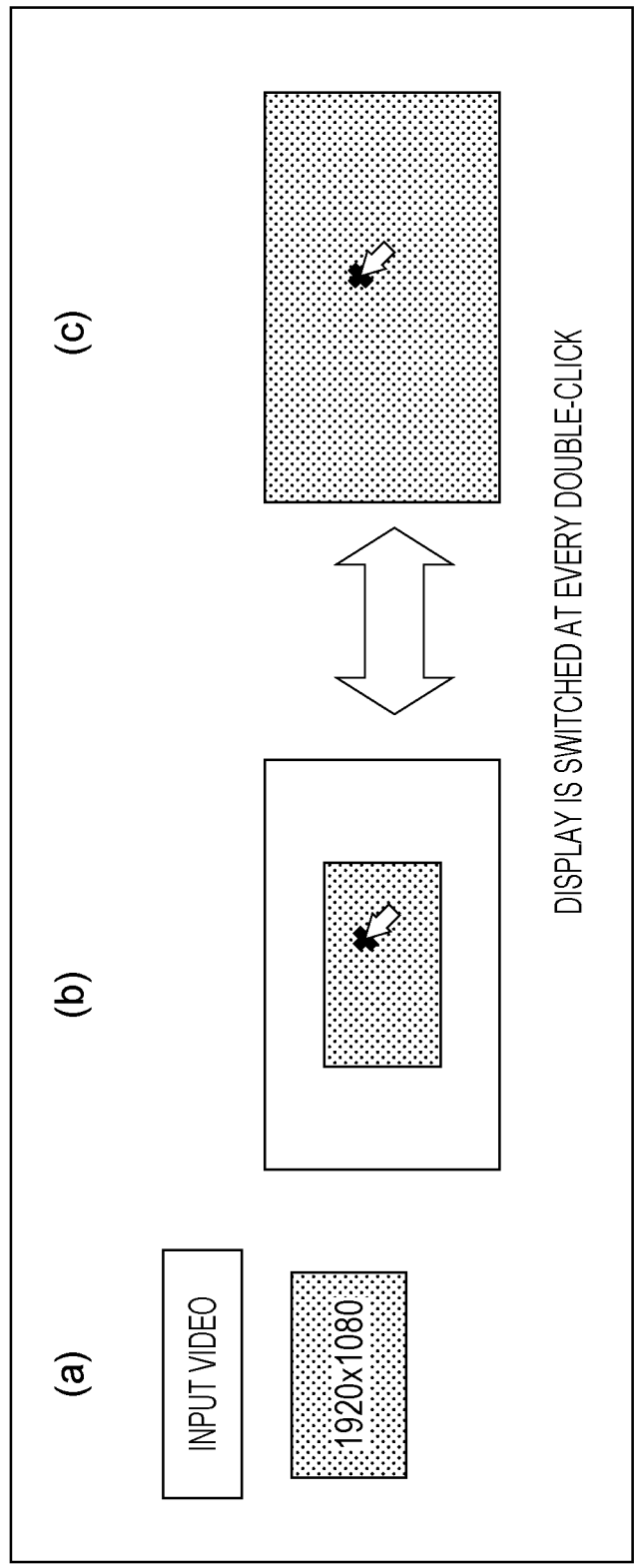
FIG. 15 is a view for explaining an effect in the present embodiment.

As shown in FIG. 15($a$), when an input video is one video of full hi-vision with a resolution of 1920×1080, each time the sensor unit 21 is double-clicked, display shown in FIG. 15($b$) and display shown in FIG. 15($c$) are switched. Here, by double-clicking, an original video is enlarged, the enlarged video is reduced to be returned to the original video, etc.

Moreover, the display mode is switched even when double-clicking any part of the sensor unit 21. Note that, by changing the processing method, it is also possible to change the display mode of the screen which is double-clicked.

As described above, when the resolution of the input video is changed, that is, display with the resolution of the original video (1920×1080) shown in FIG. 15($b$) is switched to display of enlargement (resolution: 3840×2160) shown in FIG. 15($c$) by double-clicking the sensor unit 21, the video to be displayed on the display unit 17 of the multi-screen display apparatus 101 may be enlarged by transmitting a coordinate of a touched position acquired by the coordinate acquisition unit 22 (acquired coordinate) to the PC and increasing the resolution of the input video on a PC side, for example, from 1920×1080 to 3840×2160.

Note that, in this case as well, the display mode is not changed in the same manner as the case of double-clicking.

Embodiment 4

Another embodiment of the present invention will be described below. Note that, same reference numerals are assigned to members having same functions as those of the embodiments 1 to 3 and detailed description thereof will be omitted.

It is different from the embodiment 3 in that a simultaneous video processing parameter change mode which is a mode for changing a video processing parameter in accordance with a coordinate which is acquired, and at the same time, outputting the coordinate to the coordinate transmission unit is added.

In the simultaneous video processing parameter change mode, an acquired coordinate and an acquisition state are transmitted to the video processing parameter control unit 13 and a converted coordinate value is transmitted to the coordinate transmission unit 24. Here, as described above, there are eight types of the acquisition states, including 1. TOUCH DOWN
2. TOUCH UP
3. TOUCH MOVE
4. DBLCK TOUCH
5. TOUCH2 DOWN
6. TOUCH2 UP
7. TOUCH2 MOVE
8. DBLCK2 TOUCH For example, the converted coordinate is transmitted to the coordinate transmission unit in the case of the acquisition sates 1. to 4., and the acquired coordinate and the acquisition state are transmitted to the video processing parameter control unit 13 in the case of the acquisition states 5. to 8.

(Video Processing Parameter Change Processing)

Though the judgment is performed with DBLCK TOUCH in the embodiment 3, the judgment is performed with DBLCK2 TOUCH in the present embodiment 4.

(Explanation of Effect)

According to the display apparatus by the present embodiment, depending on whether a user touches a sensor surface of the touch panel (sensor unit 21) with one finger or two fingers, it is possible to select whether to transmit a coordinate to the video supply devices (PC(0) to PC(2)) or to select a display position or a size of a screen, thus an effect of enabling further improving of operability of the user is exerted.

[Summing Up]

A multi-screen display apparatus provided with a touch panel according to an aspect 1 of the present invention comprises: a display unit 17 that displays videos supplied from a plurality of video supply devices (such as PC(0) to PC(2)) on respectively different screens simultaneously; a multi-screen processing unit 15 that processes the videos supplied from the video supply devices (such as PC(0) to PC(2)) according to a display mode that defines the number of screens for simultaneous display on a display screen of the display unit 17 and defines predetermined processing for the videos, and supplies to the display unit 17; a touch panel (sensor unit 21) that is arranged so as to cover the display screen of the display unit 17; a coordinate acquisition unit 22 that acquires, from a touched position on the touch panel (sensor unit 21), a coordinate value of the touched position; a coordinate processing unit 23 that defines a video corresponding to the touched position from the coordinate value acquired by the coordinate acquisition unit 22 and the display mode and converts the coordinate value into a coordinate value in the defined video; and coordinate transmission units 24*a* to 24*c* that transmit the coordinate value converted by the coordinate processing unit 23 to the video supply device (such as PC(0) to PC(2)) serving as a supply source of the defined video.

A display method according to an aspect 8 of the present invention is a display method of a multi-screen display apparatus provided with a touch panel including a display unit 17 that displays videos supplied from a plurality of video supply devices (such as PC(0) to PC(2)) on respectively different screens simultaneously; a multi-screen processing unit 15 that processes the videos supplied from the video supply devices (such as PC(0) to PC(2)) according to a display mode that defines the number of screens for simultaneous display on a display screen of the display unit 17 and defines predetermined processing for the videos, and supplies to the display unit; and a touch panel (sensor unit 21) that is arranged so as to cover the display screen of the display unit 17, comprising: a coordinate acquisition step of acquiring, from a touched position on the touch panel (sensor unit 21), a coordinate value of the touched position; a coordinate processing step of defining a video corresponding to the touched position from the coordinate value acquired by the coordinate acquisition step and the display mode and converting the coordinate value into a coordinate value in the defined video; and a coordinate transmission step of transmitting the coordinate value converted by the coordinate processing step to the video supply device (such as PC(0) to PC(2)) serving as a supply source of the defined video.

With this configuration, when a video corresponding to the touched position is defined from the coordinate value of the touched position on the touch panel (sensor unit 21) and the display mode and the coordinate value is converted into a coordinate value in the defined video by the coordinate processing unit 23 (coordinate processing step), the converted coordinate value is associated with the coordinate value of the touched position on the touch panel (sensor unit 21), thus making it possible to eliminate displacement between the coordinate value of the touched position and the coordinate value of the video corresponding to the touched position.

Since the converted coordinate value is then transmitted from the coordinate transmission unit 24*a* to 24*c* (coordinate transmission step) to the video supply device (such as PC(0) to PC(2)) serving as a supply source of the video defined by the coordinate processing unit 23 (coordinate processing step), it is possible to apply video processing according to the converted coordinate value to the video corresponding to the touched position on the touch panel (sensor unit 21) on a side of the video supply device (such as PC(0) to PC(2)).

In this manner, since it is adapted to acquire the coordinate value of the video corresponding to the touched position with the coordinate value of the touched position and the display mode, it is possible to define the video corresponding to the touched position on the touch panel (sensor unit 21) according to the display mode at all times even when the display mode is switched, thus making it possible to realize a multi-screen display apparatus provided with a touch panel having excellent operability in which displacement between the coordinate of the touched position on the touch panel (sensor unit 21) and the coordinate of the video which is displayed is not caused.

It is preferable for a multi-screen display apparatus provided with a touch panel according to an aspect 2 of the present invention that, in the aspect 1, the coordinate processing unit 23 includes a video defining unit (range selection unit 231) that defines a video corresponding to the touched position from the coordinate value acquired by the coordinate acquisition unit 22 and the display mode, and coordinate conversion units 232*a* to 232*c* that convert the coordinate value into a coordinate value in the defined video, and the coordinate conversion units 232*a* to 232*c* are provided in plural so as to correspond to each of the video supply devices (such as PC(0) to PC(2)), the video defining unit (range selection unit 231) outputs the coordinate value to the coordinate conversion unit 232*a* to 232*c* corresponding to the video supply device (such as PC(0) to PC(2)) serving as the supply source of the defined video, and the coordinate transmission units 24*a* to 24*c* transmit each coordinate value converted by each of the coordinate conversion units 232*a* to 232*c* to each of the video supply devices (such as PC(0) to PC(2)) of the defined video.

With this configuration, the video defining unit (range selection unit 231) defines a video corresponding to the touched position and outputs the coordinate value to the coordinate conversion unit 232*a* to 232*c* corresponding to the video supply device (such as PC(0) to PC(2)) serving as the supply source of the defined video, and the coordinate conversion unit 232*a* to 232*c* converts the input coordinate value into a coordinate value in the defined video to transmit to the video supply device (such as PC(0) to PC(2)) serving as the supply source of the defined video, thereby the converted coordinate value is to be transmitted only to the video supply device (such as PC(0) to PC(2)) serving as the supply source of the video corresponding to the touched position touched at a touch panel (sensor unit 21).

Then, on a side of the video supply device (such as PC(0) to PC(2)), desired processing is applied to a video which is supplied based on the converted coordinate value for transmitting to the multi-screen processing unit 15 again.

This makes it possible to associate the coordinate of the touched position on the touch panel (sensor unit 21) and the coordinate of the video corresponding to the touched position appropriately, so that it is possible to define the video corresponding to the touched position on the touch panel (sensor unit 21) according to the display mode at all times even when the display mode is switched, thus making it possible to realize a multi-screen display apparatus provided with a touch panel having excellent operability in which displacement between the coordinate of the touched position on the touch panel (sensor unit 21) and the coordinate of the video which is displayed is not caused.

It is preferable for a multi-screen display apparatus provided with a touch panel according to an aspect 3 of the present invention that, in the aspect 2, the video defining unit (range selection unit 231), when there are a plurality of videos corresponding to the touched position, outputs the coordinate value to the coordinate conversion unit 232a to 232c corresponding to the video supply device serving as a supply source of a video having a high priority, which is set in advance.

With this configuration, it is adapted so that even when a position where a plurality of videos are superimposed is touched on the touch panel (sensor unit 21), the coordinate value of the video corresponding to the touched position is output to the coordinate conversion unit 232a to 232c corresponding to the video supply device (PC(0) to PC(2)) serving as a supply source of a video having a high priority, which is set in advance, so that it is possible to associate the coordinate of the touched position on the touch panel and the coordinate of the video corresponding to the touched position appropriately.

Here, as to a relation between video display and a priority of a video, for example, a video having a higher priority is displayed on a front face side among videos which are superimposed. This makes it possible for a user to perform a touch operation as he or she imagined only by performing a touch operation to a video which is displayed on a front-most surface.

It is preferable for a multi-screen display apparatus provided with a touch panel according to an aspect 4 of the present invention that, in the aspect 2, the video defining unit (range selection unit 231), when there are a plurality of videos corresponding to the touched position, outputs the coordinate value simultaneously to the coordinate conversion units 232a to 232c corresponding to the video supply devices serving as a supply source of each of the videos.

With this configuration, it is adapted so that when a position where a plurality of videos are superimposed is touched on the touch panel (sensor unit 21), the coordinate value of the videos corresponding to the touched position is output to the coordinate conversion units 232a to 232c corresponding to the video supply devices (PC(0) to PC(2)) serving as the supply sources of all the videos which are superimposed, so that it is possible to associate the coordinate of the touched position on the touch panel (sensor unit 21) and the coordinate of all the videos corresponding to the touched position appropriately.

In a multi-screen display apparatus provided with a touch panel according to an aspect 5 of the present invention, in the aspect 2, in a case where processing that, when there are a plurality of videos corresponding to the touched position, the coordinate value is output to the coordinate conversion unit 232a to 232c corresponding to the video supply device (PC(0) to PC(2)) serving as a supply source of a video having a high priority, which is set in advance, is individual processing mode, and processing that, when there are a plurality of videos corresponding to the touched position, the coordinate value is output simultaneously to the coordinate conversion units 232a to 232c corresponding to the video supply devices (PC(0) to PC(2)) serving as a supply source of each of the videos is simultaneous processing mode, mode switching means (input unit 25) for switching the individual processing mode and the simultaneous processing mode may be further included.

With this configuration, a user is able to switch the individual processing mode and the simultaneous processing mode by the mode switching means (input unit 25) as necessary.

A multi-screen display apparatus provided with a touch panel according to an aspect 6 of the present invention comprises: a display unit 17 that displays videos supplied from a plurality of video supply devices (PC(0) to PC(2)) on respectively different screens simultaneously; a multi-screen processing unit 15 that processes the videos supplied from the video supply devices (PC(0) to PC(2)) according to a display mode that defines the number of screens for simultaneous display on a display screen of the display unit 17 and defines predetermined processing for the videos, and supplies to the display unit 17; a video processing parameter control unit 13 that sets a video processing parameter for executing the display mode used for video processing in the multi-screen processing unit 15; a touch panel (sensor unit 21) that is arranged so as to cover the display screen of the display unit 17; a coordinate acquisition unit 22 that acquires, from a touched position on the touch panel (sensor unit 21), a coordinate value of the touched position; and a video defining unit (range selection unit 231) that defines a video corresponding to the touched position from the coordinate value acquired by the coordinate acquisition unit 22 and the display mode, wherein the video processing parameter control unit 13 changes the video processing parameter of the video defined by the video defining unit (range selection unit 231) according to the coordinate value acquired by the coordinate acquisition unit 22.

A display method according to an aspect 9 of the present invention is a display method of a multi-screen display apparatus provided with a touch panel including a display unit 17 that displays videos supplied from a plurality of video supply devices (PC(0) to PC(2)) on respectively different screens simultaneously; a multi-screen processing unit 15 that processes the videos supplied from the video supply devices (PC(0) to PC(2)) according to a display mode that defines the number of screens for simultaneous display on a display screen of the display unit 17 and defines predetermined processing for the videos, and supplies to the display unit 17; and a touch panel (sensor unit 21) that is arranged so as to cover the display screen of the display unit 17, comprising: a coordinate acquisition step of acquiring, from a touched position on the touch panel (sensor unit 21), a coordinate value of the touched position; a video defining step of defining a video corresponding to the touched position from the coordinate value acquired by the coordinate acquisition step and the display mode; a video processing parameter change step of changing a video processing parameter of the video defined by the video defining step according to the coordinate value acquired by the coordinate acquisition step; and a video processing step of performing processing of the video defined by the video defining step by using the video processing parameter changed by the video processing parameter change step.

With this configuration, when the video processing parameter control unit 13 (video processing parameter change step) changes a video processing parameter of the video defined by the video defining unit (range selection unit 231) (video defining step) according to the coordinate value acquired by the coordinate acquisition unit 22 (coordinate acquisition step), the multi-screen processing unit 15 is to perform conversion of the coordinate value of the video corresponding to the touched position on the touch panel (sensor unit 21) and associated video processing.

This makes it possible to perform the video processing according to the touched position on the touch panel (sensor unit 21) on the display apparatus side without transmitting the converted coordinate value of the video to the video supply device (PC(0) to PC(2)) serving as the supply source of the defined video.

A multi-screen display apparatus provided with a touch panel according to an aspect 7 of the present invention comprises: a display unit 17 that displays videos supplied from a plurality of video supply devices (PC(0) to PC(2)) on respectively different screens simultaneously; a multi-screen processing unit 15 that processes the videos supplied from the video supply devices (PC(0) to PC(2)) according to a display mode that defines the number of screens for simultaneous display on a display screen of the display unit 17 and defines predetermined processing for the videos, and supplies to the display unit 17; a video processing parameter control unit 13 that sets a video processing parameter for executing the display mode used for video processing in the multi-screen processing unit 15; a touch panel (sensor unit 21) that is arranged so as to cover the display screen of the display unit 17; a coordinate acquisition unit 22 that acquires, from a touched position on the touch panel (sensor unit 21), a coordinate value of the touched position; coordinate transmission units 24a to 24c that transmit the coordinate value to the video supply device (PC(0) to PC(2)) serving as a supply source of a video; and a coordinate processing unit 23 that defines a video corresponding to the touched position from the coordinate value acquired by the coordinate acquisition unit 22 and acquires an acquisition state and a converted coordinate from the coordinate value for outputting the converted coordinate to the coordinate transmission unit 24a to 24c and the acquisition state and the acquired coordinate to the video processing parameter control unit 13, wherein the video processing parameter control unit 13 changes a video processing parameter of the video defined by the coordinate processing unit 23 according to the acquisition state and an acquired coordinate value processed by the coordinate processing unit 23, and the coordinate transmission unit 24a to 24c transmits the coordinate value converted by the coordinate processing unit 23 to the video supply device (PC(0) to PC(2)) serving as a supply source of the video defined by the coordinate processing unit 23.

A display method according to an aspect 10 of the present invention is a display method of a multi-screen display apparatus provided with a touch panel including a display unit 17 that displays videos supplied from a plurality of video supply devices (PC(0) to PC(2)) on respectively different screens simultaneously; a multi-screen processing unit 15 that processes the videos supplied from the video supply devices (PC(0) to PC(2)) according to a display mode that defines the number of screens for simultaneous display on a display screen of the display unit 17 and defines predetermined processing for the videos, and supplies to the display unit 17; a video processing parameter control unit 13 that sets a video processing parameter for executing the display mode used for video processing in the multi-screen processing unit 15; a touch panel (sensor unit 21) that is arranged so as to cover the display screen of the display unit 17; and coordinate transmission units 24a to 24c that transmit the coordinate value to the video supply device (PC(0) to PC(2)) serving as a supply source of a video, comprising: a coordinate acquisition step of acquiring, from a touched position on the touch panel (sensor unit 21), a coordinate value of the touched position; a video defining step of defining a video corresponding to the touched position from the coordinate value acquired by the coordinate acquisition step; a coordinate processing step of acquiring an acquisition state and a converted coordinate value from the coordinate value acquired by the coordinate acquisition step and outputting the converted coordinate value which is acquired to the coordinate transmission unit 24a to 24c and the acquisition state and the acquired coordinate to the video processing parameter control unit 13; a video processing parameter change step of changing a video processing parameter of the video defined by the video defining step according to the acquisition state and the acquired coordinate value output by the coordinate processing step; and a coordinate transmission step of transmitting the converted coordinate value output by the coordinate processing step to the video supply device (PC(0) to PC(2)) serving as a supply source of the video defined by the video defining step.

With this configuration, when the coordinate processing unit 23 (coordinate processing step) defines a video corresponding to the touched position from the coordinate value acquired by the coordinate acquisition unit 22 (coordinate acquisition step) and acquires an acquisition state and a converted coordinate from the coordinate value for outputting the converted coordinate to the coordinate transmission unit 24a to 24c and outputting the acquisition state and the acquired coordinate to the video processing parameter control unit 13, it is possible to perform an operation of transmitting the coordinate value by the coordinate transmission units 24a to 24c and control of the video processing parameter by the video processing parameter control unit 13 only by acquiring the coordinate value of the touched position.

Thereby, depending on whether a user touches a sensor surface of the touch panel (sensor unit 21) with one finger or two fingers, it is possible to select whether to transmit a coordinate to the video supply devices (PC(0) to PC(2)) or to select a display position or a size of a screen, thus an effect of enabling further improving of operability of the user is exerted.

The present invention is not limited to each of the embodiments described above, but may be modified in various manners within the scope of the claims and any embodiment achieved by appropriately combining technical means disclosed in each of different embodiments is also encompassed in the technical scope of the present invention. Further, by combining the technical means disclosed in each of the embodiments, a new technical feature may be formed.

INDUSTRIAL APPLICABILITY

The present invention is suitable for a display apparatus provided with a touch panel, and is applicable, in particular, to a multi-screen display apparatus provided with a touch panel.

REFERENCE SIGNS LIST 1 coordinate conversion unit
2 coordinate conversion unit 11a to 11c video reception unit
12 input unit
13 video processing parameter control unit
14 video processing parameter holding unit
15 multi-screen processing unit
16 timing control unit
17 display unit
21 sensor unit (touch panel)
22 coordinate acquisition unit
23 coordinate processing unit
24a to 24c coordinate transmission unit(0) to (2)
25 input unit (mode switching means)
26 coordinate processing mode holding unit
101 multi-screen display apparatus
102 touch panel unit
103a to 103c PC(0) to PC(2)
231 range selection unit (video defining unit)
232a to 232c coordinate conversion unit(0) to (2)
1001 display apparatus
1002 touch panel
1011 video reception unit
1012 input unit
1013 video processing parameter control unit
1014 video processing parameter holding unit
1015 video processing unit
1016 timing control unit
1017 display unit
1021 sensor unit
1022 coordinate acquisition unit
1023 coordinate conversion unit
1024 coordinate transmission unit
1031 coordinate reception unit
1032 CPU
1033 memory
1034 recording area
1035 video output unit

The invention claimed is:
1. A multi-screen display, comprising:
a display apparatus;
a plurality of different screens; and
a touch panel; wherein
the display apparatus displays videos supplied from a plurality of video supply devices on respective ones of the plurality of different screens simultaneously;
the display apparatus processes the videos supplied from the video supply devices according to a display mode that defines the number of screens for simultaneous display on the plurality of different screens and defines predetermined processing for the videos, and supplies processed video to the plurality of different screens;
the touch panel covers at least one of the plurality of different screens;
the touch panel acquires, from a touched position on the touch panel, a coordinate value of the touched position;
the touch panel defines a video corresponding to the touched position from the coordinate value acquired and the display mode and converts the coordinate value into a coordinate value in the defined video;
the touch panel defines the video corresponding to the touched position from the coordinate value acquired and the display mode, and
the touch panel converts the coordinate value into a coordinate value in the defined video and provides plural outputs which correspond to each of the video supply devices, and the touch panel outputs the coordinate value to the video supply device serving as a supply source of the defined video, and
the touch panel transmits the coordinate value which has been converted to the video supply device serving as a supply source of the defined video,
the touch panel transmits each coordinate value which has been converted to each of the video supply devices of the defined video.
2. The multi-screen display according to claim 1, wherein the touch panel, when there are a plurality of videos corresponding to the touched position, outputs the coordinate value corresponding to the video supply device serving as a supply source of a video having a high priority, which is set in advance.
3. The multi-screen display according to claim 1, wherein the touch panel, when there are a plurality of videos corresponding to the touched position, outputs the coordinate value simultaneously to the video supply devices serving as a supply source of each of the videos.
4. The multi-screen display according to claim 1, wherein
in a case where processing that, when there are a plurality of videos corresponding to the touched position, the coordinate value is output to the video supply device serving as a supply source of a video having a high priority, which is set in advance, is an individual processing mode,
processing that, when there are a plurality of videos corresponding to the touched position, the coordinate value is output simultaneously to the video supply devices serving as a supply source of each of the videos is a simultaneous processing mode, and
the display apparatus is able to switch between the individual processing mode and the simultaneous processing mode.
5. A multi-screen display, comprising:
a display apparatus;
a plurality of different screens; and
a touch panel; wherein
the display apparatus displays videos supplied from a plurality of video supply devices on respective ones of the plurality of different screens simultaneously;
the display apparatus processes the videos supplied from the video supply devices according to a display mode that defines the number of screens for simultaneous display on the plurality of different screens and defines predetermined processing for the videos and supplies processed video to the plurality of different screens;
the display apparatus sets a video processing parameter for executing the display mode used for video;
the touch panel covers at least one of the plurality of different screens;
the touch panel acquires, from a touched position on the touch panel, a coordinate value of the touched position; and
the touch panel defines a video corresponding to the touched position from the coordinate value acquired by the touch panel and the display mode, wherein
the display apparatus changes the video processing parameter of the video defined by the touch panel according to the coordinate value acquired.
6. A multi-screen display, comprising:
a display apparatus;
a plurality of different screens; and
a touch panel; wherein the display apparatus displays videos supplied from a plurality of video supply devices on respective ones of the plurality of different screens simultaneously;

the display apparatus processes the videos supplied from the video supply devices according to a display mode that defines the number of screens for simultaneous display on the plurality of different screens and defines predetermined processing for the videos, and supplies processed video to the plurality of different screens;

the display apparatus sets a video processing parameter for executing the display mode used for video processing;

the touch panel covers at least one of the plurality of different screens;

the touch panel acquires, from a touched position on the touch panel, a coordinate value of the touched position;

the touch panel transmits the coordinate value to the video supply device serving as a supply source of the video; and the touch panel defines a video corresponding to the touched position from the coordinate value acquired and acquires an acquisition state and a converted coordinate from the coordinate value for outputting the converted coordinate and the acquisition state and the acquired coordinate to the display apparatus, wherein the display apparatus changes a video processing parameter of the video defined by the touch panel according to the acquisition state and an acquired coordinate value processed by the touch panel, and the touch panel transmits the coordinate value converted to the video supply device serving as a supply source of the video defined by the touch panel.

\* \* \* \* \*